United States Patent
Bowman

[19]

[11] Patent Number: 6,022,385
[45] Date of Patent: Feb. 8, 2000

[54] PROCESS FOR THE MANUFACTURE OF SODIUM CARBONATE CRYSTALS FROM MINERALS OR SOLUTIONS

[76] Inventor: Ronald W. Bowman, 5574-B Everglades St., Ventura, Calif. 93003

[21] Appl. No.: 08/639,611

[22] Filed: Apr. 29, 1996

Related U.S. Application Data

[63] Continuation-in-part of application No. 08/246,219, May 19, 1994, abandoned.

[51] Int. Cl.[7] .............................. C01D 1/30; C01D 7/14; C01D 7/24; B01D 9/02
[52] U.S. Cl. .......................... 23/302 T; 23/298; 23/300; 423/206.2; 423/421; 423/422
[58] Field of Search ................................. 23/295 R, 298, 23/300, 302 T, 302 R; 423/184, 206.2, 421, 422, 423

[56] References Cited

U.S. PATENT DOCUMENTS

| | | | |
|---|---|---|---|
| 2,378,147 | 6/1945 | McGeorge et al. | 167/22 |
| 3,231,340 | 1/1966 | Gaska | 23/300 |
| 3,597,168 | 8/1971 | Hoppe et al. | 23/300 |
| 3,925,028 | 12/1975 | Lozano | 23/298 |
| 4,010,243 | 3/1977 | Thomas | 423/424 |
| 4,548,614 | 10/1985 | Ireland | 23/300 |
| 4,584,077 | 4/1986 | Chlanda et al. | 423/206 T |
| 4,879,042 | 11/1989 | Hanson et al. | 423/184 |
| 5,262,134 | 11/1993 | Frint et al. | 23/302 T |
| 5,330,618 | 7/1994 | Daniels | 159/47.1 |
| 5,518,727 | 5/1996 | Lajoie et al. | 423/422 |

OTHER PUBLICATIONS

Perry, John H, Chemical Engineers Handbook Third Edition 1950, McGraw–Hill Book Co. NY NY pp. 1050–1057.

*Primary Examiner*—Gary P. Straub
*Attorney, Agent, or Firm*—Harrison & Egbert

[57] ABSTRACT

A method of producing sodium carbonate crystals from a sodium carbonate-containing solution including the steps of passing the sodium carbonate-containing solution to a precipitator, adding methanol to the sodium carbonate-containing solution in the precipitator such that a resultant liquor has methanol in a concentration of between 15% and 70% by volume, precipitating the sodium carbonate crystals from the resultant liquor, washing the precipitated sodium carbonate crystals with an alcohol-containing solution and drying the washed precipitated sodium carbonate crystals. The sodium carbonate-containing solution has a sodium carbonate concentration ranging between 100 g/l to saturation. The methanol is in residence with the sodium carbonate-containing solution for between 10 and 100 minutes. The alcohol-containing solution has an alcohol concentration ranging between 50% and 100%.

29 Claims, 14 Drawing Sheets

PROCESS FOR THE MANUFACTURE OF SODIUM CARBONATE CRYSTALS FROM MINERALS OR SOLUTIONS

RELATED APPLICATIONS

The present application is a continuation-in-part of U.S. patent application Ser. No. 08/246,219, filed on May 19, 1994, and entitled "PROCESS FOR THE MANUFACTURE OF SODIUM CARBONATE, SODIUM BICARBONATE AND/OR SESQUICARBONATE", now abandoned.

TECHNICAL FIELD

The present invention relates to processes for manufacturing sodium carbonate and sodium bicarbonate crystals. More particularly, the present invention relates to methods and apparatus for forming sodium carbonate crystals of a desired size, shape and density.

BACKGROUND ART

Much of the world's production of soda ash is produced from natural trona deposits. Natural trona ore is a hydrated mixture of sodium carbonate and sodium bicarbonate along with various organic and inorganic impurities. Currently, soda ash is produced from trona by one of two processes (1) the monohydrate process or (2) the sesquicarbonate process.

In the monohydrate process, trona ore is first calcined in a rotary kiln at temperatures of 175 to 200° C./347 to 397° F. This serves to convert bicarbonate to carbonate. Calcining operations at temperatures between 350 to 400° C. also destroy organic impurities present in the ore. Inorganic contaminants are removed from the calcined trona by dissolving the material in water and recrystallizing sodium carbonate from the filtered solution through the use of heat applied to the water. Soluble inorganic impurities, such as sodium carbonate and sodium sulfate, remain in the mother liquor. Insoluble impurities, such as shale and calcium carbonate, are removed by filtration prior to crystallization. The resulting sodium carbonate crystals, in the monohydrate form, are separated by filtration or centrifugation. The monohydrate crystals are then dried and calcined to anhydrous sodium carbonate.

The sesquicarbonate process utilizes basically the same unit operations as the monohydrate process. However, the arrangement of these unit operations differs. In the sesquicarbonate process, trona ore is first dissolved in hot water and the resulting solution filtered to remove insoluble impurities. Organic impurities are then removed by adsorption of the organics on activated carbon. Pure trona (or sesquicarbonate) is then recrystallized from the purified solution by using triple-effect evaporators. A solution of sodium carbonate (to maintain in excess of 10 to 25% excess carbonate) is recycled in the evaporators so as to obtain the sesquicarbonate. Since trona is an incongruently dissolving double salt, sesquicarbonate cannot be formed by cooling. This, once again, leaves soluble inorganic impurities in the mother liquor. The sesquicarbonate crystals are then calcined to produce sodium carbonate.

These processes are described in detail in various U.S. patents. For example, U.S. Pat. No. 3,479,133, issued on Nov. 18, 1969, to F. M. Warzel describes the monohydrate process. U.S. Pat. No. 3,119,655, issued in January of 1964, to Frint et al. describes the sesquicarbonate process. Similarly, U.S. Pat. No. 3,260,567, issued on July of 1966, to Hellmers et al. and U.S. Pat. No. 3,361,540, issued on Jan. 2, 1968, to Peverly et al. teach these sesquicarbonate processes.

Both the monohydrate and sesquicarbonate processes produce sodium carbonate crystals having a density range of 0.95 to 1.25 g/cc. Some applications (those in which the sodium carbonate is to be used in solution form) prefer the use of lower density crystals or higher surface area crystals. U.S. Pat. No. 5,043,149, issued on Aug. 27, 1991, to Frint et al., and assigned to the FMC Corporation, describes a process for the manufacture of such low density soda ash crystals. Sodium carbonate crystals obtained from all of the above process will vary greatly in size distribution. A large variety of commercial products are produced by the above-described processes. Each of the sodium carbonate crystals formed by these various processes were analyzed for the purpose of showing the size distribution of the crystals. The attached Table I shows the size distribution and shape of the various commercial products:

TABLE I

Commercial Products

| Solution ID | FMC 100 | FMC 160 | FMC 260 | RP Lite | RP Dense | General Chemical Synthetic | ITOCHU Chem Fine Synthetic |
|---|---|---|---|---|---|---|---|
| MeOH Feed rate | N/A | N/A | N/A | N/A | N/A | N/A | N/A |
| RP feed rate | N/A | N/A | N/A | N/A | N/A | N/A | N/A |
| MeOH feed rate | N/A | N/A | N/A | N/A | N/A | N/A | N/A |
| Initial soln. volume | | | | | | | |
| RPM | N/A | N/A | N/A | N/A | N/A | N/A | N/A |
| Location of addition | N/A | N/A | N/A | N/A | N/A | N/A | N/A |
| Crystal Density (lb/ft3) | 49.4 | 61.9 | 65.31 | 52 | 61.4 | 35 | 60.2 |
| Size Distribution (%) | | | | | | | |
| 1000 u | | | | | | | 0.2 |
| 850 u | 0 | 0 | 0 | 2.8 | 0.3 | 0 | 3.6 |
| 600 u | | | 0.03 | | | | 8.5 |
| 425 u | | | 0.98 | | | | 21.1 |
| 355 u | 15.5 | 10.1 | 11.38 | 28.5 | 54.7 | 4.1 | |
| 300 u | | | | | | | 23.3 |
| 250 u | 30.4 | 35.8 | 29.39 | 31.7 | 33.2 | 4.3 | |
| 212 u | | | | | | | 24.5 |
| 150 u | | | 29.48 | | | | 13.5 |

TABLE I-continued

Commercial Products

| Solution ID | FMC 100 | FMC 160 | FMC 260 | RP Lite | RP Dense | General Chemical Synthetic | ITOCHU Chem Fine Synthetic |
|---|---|---|---|---|---|---|---|
| 106 u | 46.4 | 49.2 | 17.21 | 32.8 | 11 | 35.2 | 3.1 |
| 75 u | | | 7.55 | | | | 0.9 |
| 63 u | 7.6 | 4.6 | 2.71 | 4.1 | 0.8 | 33.1 | |
| 45 u | | | | | | | 1 |
| <45 u | | | | | | | 0.3 |
| 38 u | 0.1 | 0.2 | | 0.1 | 0.1 | 14.5 | |
| <38 u | 0 | 0 | | 0 | 0 | 8.5 | |
| Screened | x | x | x | x | x | x | x |
| Not Screened | | | | | | | x |
| Detergency (%) | | | | | | | |
| Absorptivity (%) | 13.9 | 12.5 | | | | 25 | 17.6 |
| Sulfate (ppm) | 300 | 400 | 700 | 1000 | 1000 | 200 | 600 |
| TOC (ppm) | 56 | 2 | | | | 8 | |
| Crystal Morphology | Large rods | Small rods | Blocky | Mixed balls | Mixed balls | Small snowflakes | Small Balls |
| Date | 6/26/95 | 6/28/95 | 9/1/95 | 6/28/95 | 6/28/95 | 6/28/95 | Nov. 95 |

The various sizes, shapes and distributions of crystals are applicable in various processes. For example, a large size distribution can adversely affect the dissolving rates of the sodium carbonate and also can produce undesirable dust (at less than about 60 microns). This poses a problem if the material is to be used in dry processes, such as glass manufacturing. In addition, a wide particle size distribution can cause serious problems in the filtration or centrifugation processes which are used to separate the crystals from the mother liquor. As such, it is desirable to form sodium carbonate crystals which have a size distribution, shape and density which mirrors that of commercial products while producing such products at a relatively low cost.

U.S. Pat. No. 4,584,077, issued on Apr. 22, 1986, to Chlanda et al. describes a process for recovering sodium carbonate from trona and other mixtures of sodium carbonate and sodium bicarbonate. This process includes the steps of: (1) forming an aqueous solution comprising sodium carbonate and sodium bicarbonate; (2) removing a portion of the sodium bicarbonate from the solution so as to form a mother liquor comprising sodium carbonate and a reduced amount of sodium bicarbonate; (3) subjecting the mother liquor to an electrodialytic water splitting by circulating the water liquor through an electrodialytic water splitter to produce a liquid reaction product comprising sodium carbonate substantially free of sodium bicarbonate; and (4) withdrawing the liquid reaction product comprising sodium carbonate substantially free of sodium bicarbonate from the electrodialytic water splitter. In this patent, it was described that the sodium carbonate solution product from the base compartment is fed to a primary absorber wherein a liquid loading substance is absorbed into the sodium carbonate solution. The "liquid loading substance" includes liquids such as ammonia, methanol, ethanol and the like. This is added to the sodium carbonate solution to cause the sodium carbonate to crystallize out as the decahydrate, monohydrate or mixtures thereof. As a reaction product, these can be readily separated from the crystallized sodium carbonate-containing material.

This Chlanda process is an extremely energy inefficient process for producing sodium carbonate from trona. A sodium carbonate solution is produced from an electrodialytic water splitter. Sodium bicarbonate is converted to sodium carbonate prior to reacting with the "liquid loading substance".

It is an object of the present invention to provide a method for the manufacture of sodium carbonate or bicarbonate crystals that is cost effective.

It is another object of the present invention to provide a process for the manufacture of sodium carbonate or bicarbonate from trona or other bicarbonate and/or carbonate minerals or solutions that allows for an improved control of crystal size, shape, and density without the use of organic or inorganic additive agents.

It is another object of the present invention to provide a process that can be used on any bicarbonate, carbonate or bicarbonate-carbonate mixture.

It is still a further object of the present invention to provide a process that allows for the controlled production of bicarbonates and carbonates.

It is another and further object of the present invention to provide a process that controls crystal size, shape and density for carbonate precipitated from carbonate solution and for bicarbonate/carbonate mixtures.

It is still a further object of the present invention to provide a precipitation step that allows for the conversion of bicarbonate to carbonate or carbonate to bicarbonate for certain ratios of carbonate to bicarbonate.

It is still another object of the present invention to provide for wet calcining of trona or other bicarbonate/carbonate mixtures to carbonate through the use of steam stripping.

It is still a further object of the present invention to provide a process whereby the aqueous solution is added to the methanol.

These and other objects and advantages of the present invention will become apparent from a reading of the attached specification and appended claims.

SUMMARY OF THE INVENTION

The present invention is a method of producing sodium carbonate or bicarbonate from any solution or carbonate mineral, but especially from trona, that comprises the steps of: (1) passing a solution containing calcined trona, a solution of carbonate, or tailing pond water to a precipitator; (2) adding methanol of 30% to 70% by volume to the solution in the precipitator so as to precipitate carbonate from the solution, (3) washing the precipitated carbonate with an alcohol-containing solution, and (4) drying the washed precipitated crystals at low temperatures. Fundamentally, the process of the present invention provides a technique whereby sodium carbonate crystals can be formed of various sizes, shapes, densities and distributions by adjusting various parameters of the process. In particular, such sodium carbonate crystals can be produced from various inputs such as from a calcined-sodium carbonate solution, from tailing pond water, from sesquicarbonate or uncalcined trona, or from various mixtures of carbonates and bicarbonates.

In the method of the present invention, methanol is added to the solution in the precipitator so as to have a residence time of between 10 and 100 minutes. In general, the formation of small crystals is accomplished by fast addition (with a short residence time) while large crystals are produced by slow addition (with a long residence time). The step of washing the precipitated carbonate with an alcohol-containing solution comprises washing the precipitated carbonate with a mixture of methanol and water ranging from 50% methanol up to 100% methanol. It has been found that the density of the crystals is affected by the concentration of methanol in the step of washing. Where a 50% mixture of methanol and water is used, the crystals will be dense in comparison with the washing of the crystals with 100% methanol. Various other alcohols can be used, such as ethanol, propanol, butanol and acetone.

The process of the present invention can be used with a calcined trona-sodium carbonate solution. Usually, this is a solution of sodium carbonate ranging from saturation to 300 g/l at 82° C. Sodium bicarbonate in this solution can vary from near 0 to about 50 g/l.

If the initial input of sodium carbonate is tailing pond water, then the tailing pond water will usually contain about 135 g/l of sodium carbonate with about 12 g/l of sodium bicarbonate. This proportion occurs when the precipitated decahydrates are separated. The tailing pond water does not start the recovery of carbonate until the methanol concentration is at least 40% at 50° C. When the decahydrate is added back into the water, the concentration of the water becomes nearly 380 g/l sodium carbonate and 50 g/l of sodium bicarbonate. To generate an economical recovery of near 90% of the sodium carbonate from the tailing pond water, without the decahydrate, will require about 70% methanol final volume concentration addition. With the decahydrate added, the 50% final volume methanol concentration can achieve recovery of 90% or greater. So as to avoid sulfates, a methanol concentration of approximately 50% final volume or less is required.

The process of the present invention can be also used with uncalcined trona or sesquicarbonate. Uncalcined trona is made from one mole of sodium carbonate, one mole of sodium bicarbonate and two moles of water. The solubility increases with temperature and does not have the inverse solublity at higher temperatures. The solubility at 50° C. is 120 g/l of sodium carbonate and 100 g/l of sodium bicarbonate. This can vary somewhat in the equilibrium obtained as the trona goes into solution slower than sodium carbonate or calcined trona. Another variable which can change the equilibrium is the pH of the solution. Upon precipitation, sodium carbonate will precipitate first before the sesquicarbonate crystals. In order to get within the region of sesquicarbonate, the carbonate level must increase and the bicarbonate level must decrease. This can be accomplished in several ways. First, the sesquicarbonate can be dissolved in an approximately 200 g/l sodium carbonate solution. Alternatively, the sesquicarbonate can be dissolved in fresh water and then blended about 50/50 with a 400 g/l sodium carbonate solution. A third procedure would be to adjust the pH with a caustic either by adding caustic or by being dissolved in a caustic solution.

Various mixtures of bicarbonate and carbonate can also be used as an input into the process of the present invention so as to produce various crystals. The methanol concentration to achieve precipitation is dependent upon the total concentration of sodium carbonate and sodium bicarbonate, the ratio of sodium carbonate to sodium bicarbonate in the mixture, and the temperature. The concentration for causing precipitation is also affected by the presence of any crystals in the solution.

DETAILED DESCRIPTION OF THE INVENTION

Figure 1:
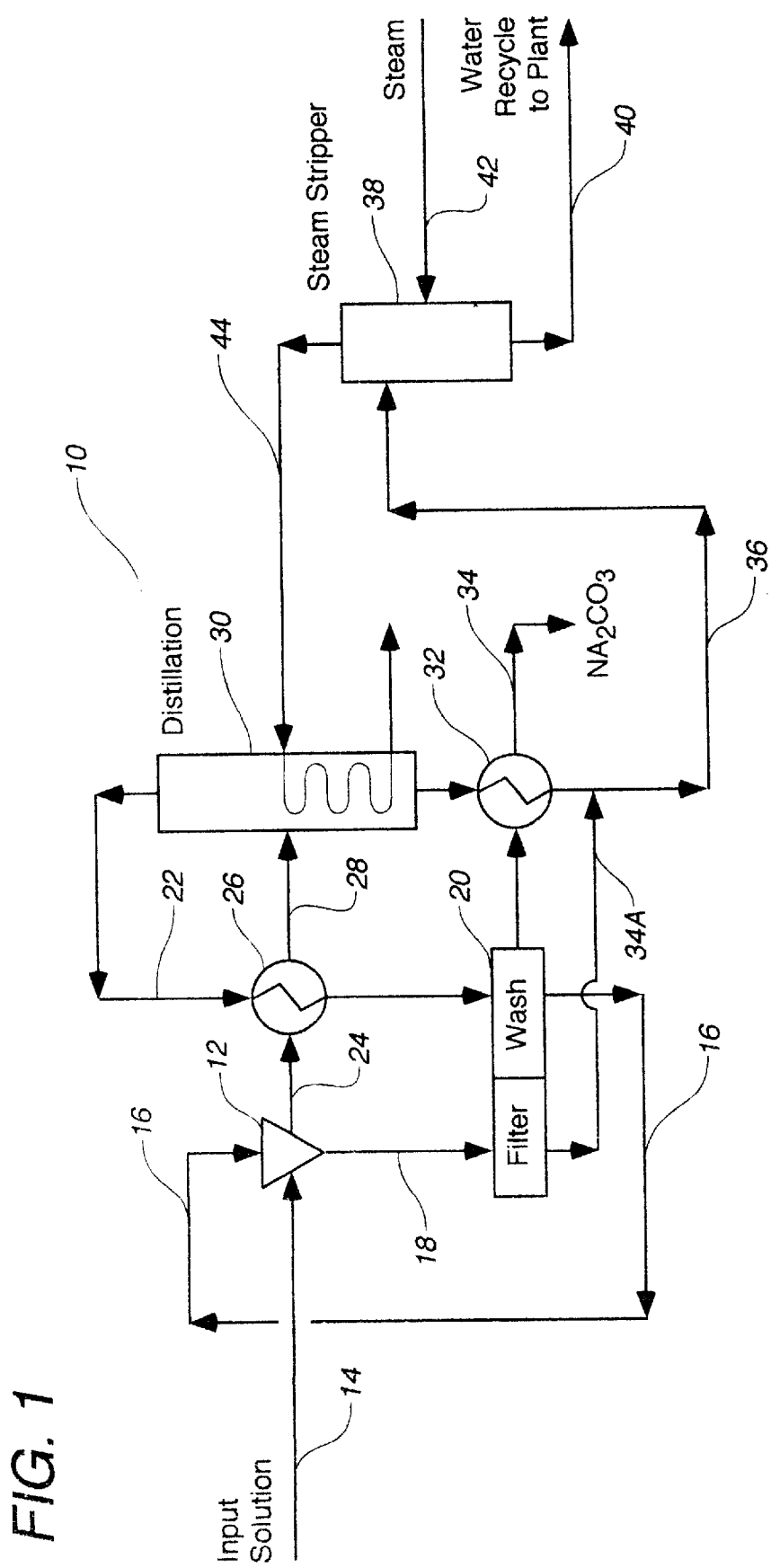
FIG. 1 is a block diagram showing the process of the present invention in its simplest form.

Referring to FIG. 1, there is shown at 10 a block diagram showing the simplest form of the process of the present invention. The process 10 of the present invention initially involves the passing of an input solution to a precipitator 12. As used herein, the "input solution" 14 can be a calcined trona or sodium carbonate solution, can be tailing pond water, can be sesquicarbonate or uncalcined trona, can be a mixture of carbonate and bicarbonates, or can be bicarbonates. The flow of the input solution will pass along line 14. When the input solution is in the precipitator 12, methanol is added to the solution in the precipitator 12 so as to precipitate carbonate (the term "carbonate" is applicable to bicarbonate, bicarbonate and carbonate including sesquicarbonate, or just carbonate solutions) from the solution. The methanol enters the precipitator 12 along line 16. The precipitated carbonate and methanol is passed along line 18 to the filter and washer 20. The precipitated carbonate is washed in the filter and washer 20 with an alcohol-containing solution. This alcohol-containing solution is passed along line 22 to the filter and washer 20. The result of the washing process will cause the flow of the alcohol to pass outwardly of washer 20 along line 16. The water solution from the filter passes along line 34A. Similarly, the remaining methanol of the precipitation process is passed along line 24 through valve 26 and outwardly therefrom along line 28 to the distiller 30. The distiller 30 will recycle the methanol by heating the methanol to a temperature in which the distillates are separated. The methanol distillate will pass along line 22, through valve 26, and to the filter and washer 20.

When the bicarbonate/carbonate crystals have been washed, the crystals are passed to a dryer 32. The dryer 32 will impart heat to the crystals so that the carbonate crystals or bicarbonate crystals (with a carbon dioxide atmosphere) can be formed. These crystals are passed outwardly along line 34 for storage exterior of the system. The heating process in the dryer 32 will cause the evaporation and heating of the water within the crystals and break the hydrate if anhydrous is desired. This evaporated water is combined into line 36 for use as part of the steam stripper 38. Line 36 passes water and contains some alcohol. Line 34A also passes water to the steam stripper 38. The steam stripper 38 will facilitate the ability to recycle the water, along line 40, back to the plant. Steam is introduced to the steam stripper 38 along line 42. The steam output of the steam stripper 38 is passed along line 44 for use in the distiller 30. The output steam of the steam stripper 30 can also serve to strip the carbon dioxide.

The input of the bicarbonate/carbonate solution 14 can be natural trona that has been calcined prior to dissolving the ore (such as is used in the monohydrate process) or natural trona that is dissolved before calcining (such as used in the sesquicarbonate process or in solution mining). In the process 10 of the present invention, the addition of the methanol 16 to the aqueous solution 14 of calcined or uncalcined trona ore serves to precipitate the carbonate or carbonated bicarbonate crystals. The resulting crystals can be separated by filtration, centrifugation or vibrating screen. The crystals are washed in the filter/washer 20 using an alcohol solution. The crystals are then dried in the dryer 32. The methanol 16 is recovered for reuse by passing through the distiller 30. In the process 10, the size, shape and distribution of the crystals is controlled by the rate of addition of methanol as well as the volume percent of methanol 16 used in the crystallization and precipitation step. The crystal density can be controlled by the concentration of alcohol used in the washer 20. The crystals produced by this process show considerably less variation in size than crystals produced by the current monohydrate or sesquicarbonate processes.

The process 10 of the present invention can be used on solutions of sodium carbonate over a concentration range of about 120 grams/liter to saturation. Depending on the size of crystals desired, methanol can be added so as to produce a final solution concentration range (a resultant liquor) of about 15 volume percent to about 70 volume percent of methanol. The average crystal size will vary as a function of the volume percent methanol that is added plus the rate of methanol addition (residence time). In the present invention, the residence time can be between 10 and 100 minutes. The residence time of the methanol with the input solution in the precipitator will affect crystal size (to be described hereinafter).

Depending on the desired crystal density, the crystals can be washed in the filter/washer 20 in alcohol solutions ranging from about 50 volume percent to 100 volume percent. The average crystal density will be a function of the volume percent of alcohol in the crystal wash solution entering the filter/washer 20 through line 22. In the step of washing, the alcohol can be methanol, ethanol, propanol, butanol and acetone.

Sesquicarbonate crystals generated by the process of the present invention can be converted to anhydrous crystals at significantly lower temperatures than crystals generated by the sesquicarbonate process.

In the process 10 of the present invention, the precipitation step is carried out at considerably lower temperatures than the evaporation process. As such, the overall energy cost to the system is reduced. The dryer 32 serves to dry the washed precipitated carbonates. The dryer should apply temperatures of no less than 120° F. to the washed precipitated carbonate therein. A pure bicarbonate passes to the dryer 32, and if it is desired to have a bicarbonate output of the dryer 32 when precipitating a pure bicarbonate solution, then the temperatures, which are applied, should be less than 150° F. and the atmosphere within the dryer should be a vacuum or, at most, atmospheric pressure. Alternatively, if a bicarbonate crystal is desired from a mixture of pure carbonate, then the atmosphere within the dryer 32 must be a carbon dioxide atmosphere. Sesquicarbonate can be formed directly from trona precipitation. Either bicarbonate or carbonate can be formed from the sesquicarbonate, depending upon the dryer process employed. For anhydrous carbonate, a drying temperature of 228° F./109° C. is required at one atmosphere of pressure.

In the process 10 of the present invention, the methanol/water mixture is continually recycled throughout the system. As can be seen, after the methanol is properly reacted with the input solution in the precipitator 12, the used methanol is passed to the distiller 30. The distiller 30 will then distill the water from the methanol such that the methanol can be recycled for use in the precipitation of the crystals. The mixture of water and methanol can be controlled throughout the process 10 so as to control crystal density, crystal size, crystal size distribution and crystal morphology.

Figure 2:
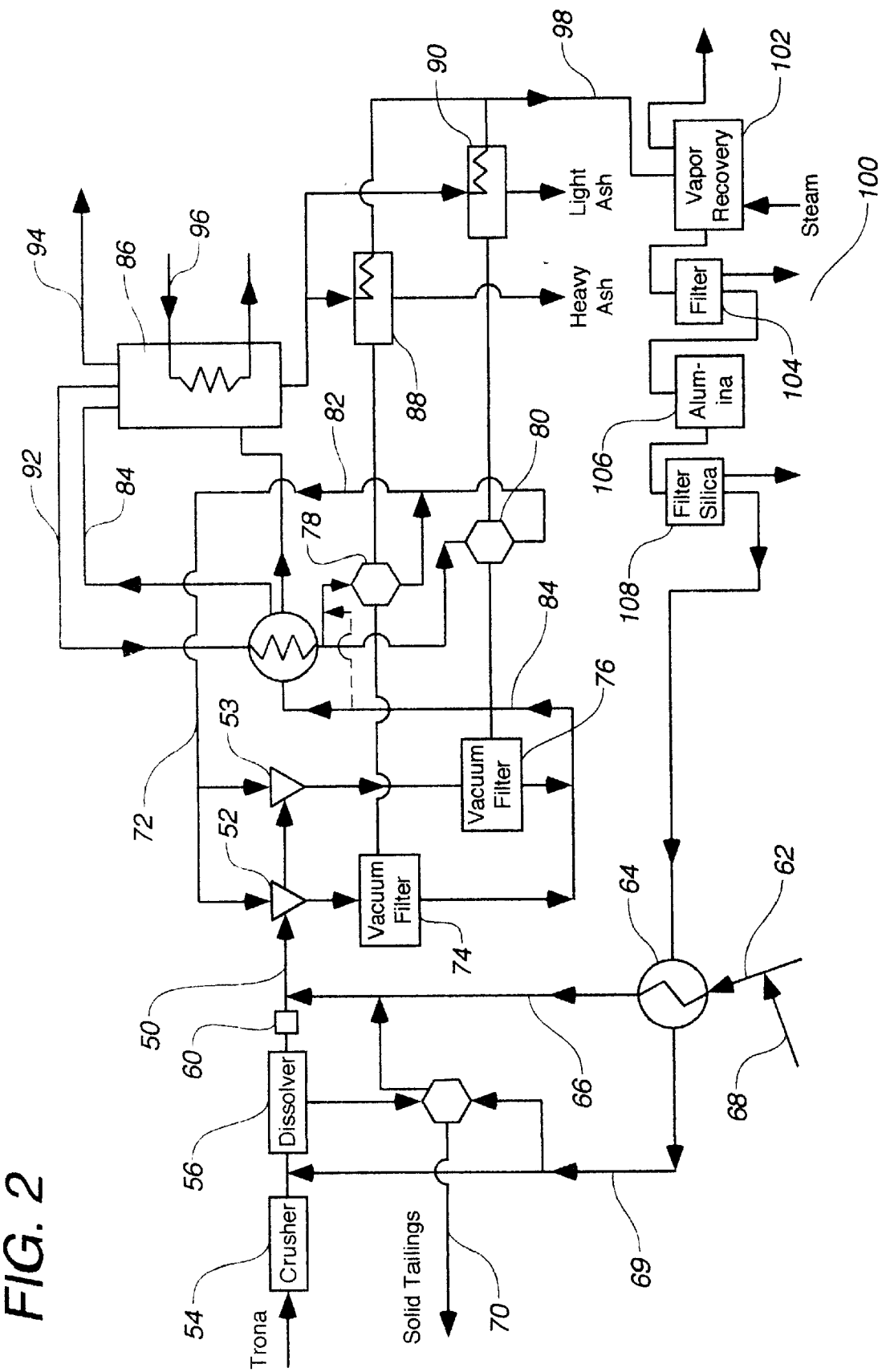
FIG. 2 is a block diagram showing the two precipitator process of the present invention, with recycle between the precipitators.
Figure 4:
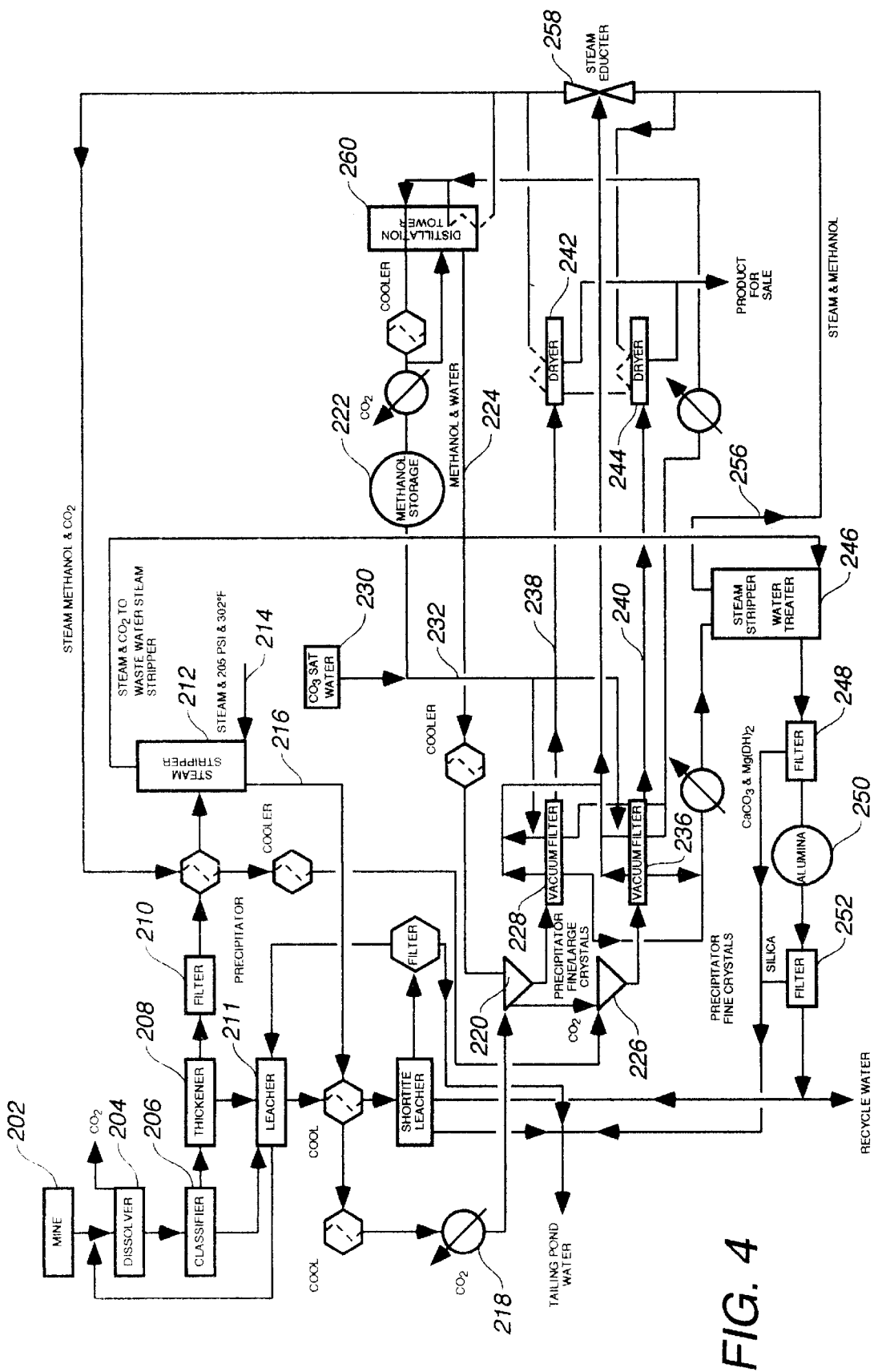
FIG. 4 is a block diagram of the wet calcining process of the preferred embodiment of the present invention.

FIG. 2 shows the simplified embodiment of the present invention for uncalcined trona as the input solution. A more complex, but more energy efficient embodiment, is shown in FIG. 4. In FIG. 2, the initial trona-containing solution passes along line 50 to a first precipitator 52 and to a second precipitator 53. The trona-containing solution 50 can be the result of passing solid trona into a crusher 54. The crusher 54 will serve to crush the solid trona into solid particles. These particles then pass to a dissolver 56. The dissolver serves to dissolve the smaller particles in water so as to form the trona-containing solution. In order to properly dissolve the trona, the water within the dissolver 56 should be heated to a temperature in excess of 100° F. The solubility of trona is dependent upon the temperature of water into which it is dissolved. The dissolver 56 serves to mix the heated water with the crushed solid trona. Any tailings from the dissolver 56 pass through line 58 to a tailings pond. A filter 60 is interposed between the dissolver 56 and the precipitators 52 and 53 so as to absorb organics and filter insolubles particulates from the trona-containing solution.

Figure 3:
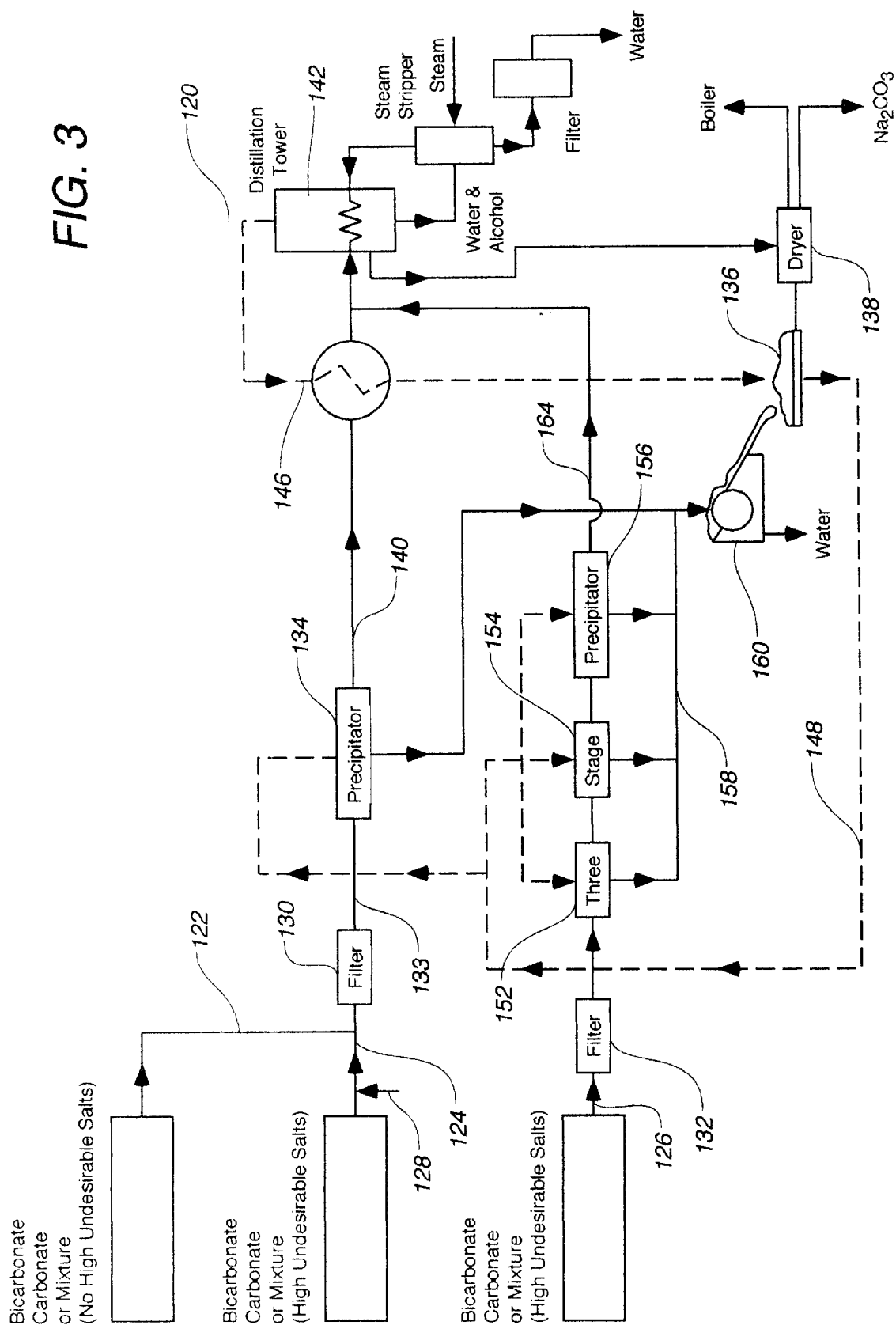
FIG. 3 is a block diagram showing an alternative embodiment of the process of the present invention where undesirable salts can be controlled by slow methanol addition or are precipitated in one of three stages.

In FIG. 2, it can be seen that a tailing pond water can pass from a tailing pond 62 through the heat exchanger 64 and into line 66. An organic inhibitor chemical 68 can be introduced to the flow of the tailing pond water from the tailing pond 62 if required. The inhibitor chemical is, preferably, an amine-like compound which serves to prevent the precipitation of sulfate into the carbonate crystals. Other embodiments for high salt solutions (as shown in FIG. 3) or slow methanol addition can also be used. The tailing pond water can pass along line 69 so as to be part of the water used in the dissolver 56 or can be valved so as to pass as part of the solid tailings 70. As can be seen in FIG. 2, there are two precipitators 52 and 53. The input solution passes to both of the precipitators 52 and 53. The methanol is then added to each of the precipitators 52 and 53. If it is desired to create large crystals from one precipitator 52 and small crystals from the other precipitator 53, then the concentration of methanol passing into the precipitators 52 and 53 from line 72 can be properly controlled or the residence time of the methanol with the solution can be controlled. In other words, the concentration of the methanol entering precipitator 52 will be different than the concentration of methanol entering the precipitator 53. Also, small crystals from the second precipitator 53 can be recycled back to the first precipitator 52 so as to generate large crystals from the first precipitator 52. As such, the arrangement of dual precipitators 52 and 53 can be used so as to "customize" crystal size. It can be seen that the output of the first precipitator 52 passes to the vacuum filter 74. Similarly, the output of the second precipitator 53 will pass to another vacuum filter 76. Similarly, the output of the second precipitator 53 will pass to another vacuum filter. The vacuum filter will separate the remaining water and methanol from the crystals. The output of the vacuum filter 74 passes to a first washer 78. Similarly, the output of the vacuum filter 76 passes to a second washer 80. When the crystals are in the separate washers 78 and 80, then different concentrations of alcohol can be used for the washing of the crystals. For example, if varying densities of crystals are desired, then one concentration of alcohol should be introduced into washer 78 and another concentration of alcohol should be introduced into washer 80. The control of the concentration of alcohol can be easily managed by the introduction of water into the flow of alcohol.

In FIG. 2, it can be seen that the output of the washers 78 and 80 passes as a single flow 82 back for use on the precipitators 52 and 53. The water and methanol outputs of the vacuum filters 74 and 76 pass as a single flow 84 as reflux back to the distiller 86. Importantly, it should be noted that the concentration of alcohol can be varied over time to produce various densities from a single washer. Also, if only large crystal sizes are desired, the crystals from the second precipitator 53 can be recycled to the first precipitator 52 and added to the incoming fluid to produce solely large crystals. Large crystals can also be formed via slow methanol addition. This produces a large crystal of different crystal morphology.

The output of the first washer 78 passes to a first dryer 88. Similarly, the crystal output of the second washer 80 passes to a second dryer 90. As stated previously, each of these dryers 88 and 90 can apply different temperatures and/or pressures to the washed carbonate crystals therein. After the crystals are dried in the dryers 88 and 90, they can be passed for storage as heavy ash, as light ash, or as intermediate size. The dual arrangement of precipitators, washers and dryers facilitates the ability to control the output of the system depending on the needs of the user.

The distiller 86 can be used to remove the water and impurities from the filtrate passing from line 84. After the filtrate has been distilled by the distiller 86, the methanol passes through line 92 back for use in the system. This methanol can, for example, be used for the washing of the crystals in the washers 78 and 80. A vapor recovery line 94 is connected to the distiller 86 so as to recover any vapors that may pass as a result of the distillation process. The distillation process is carried out by the introduction of steam 96 into the distiller 86. The water output of the distillation process can pass as a flow outwardly of the system and/or into the drying units 88 and 90. The water output passes along line 98 to a steam stripping area 100. Steam is introduced at 102 to the steam stripping area. The heated water, containing the impurities of the previously-described process, will pass through the filter 104 for the removal of calcium and magnesium. The filtered water will then pass through the alumina 106. The alumina 106 will serve to put aluminum ions into the water. The alumina 106 combines with the filter 108 so as to properly remove this silica. The output of the filter 108 then passes back to the tailing pond 62 or for use throughout the system.

In the present invention, the arrangement of the steam stripping system and the distillation system can be switched in order of placement, depending on the water analysis and system requirements. Generally, the steam stripping will be first, so as to provide lower energy requirements, by distilling part of the methanol while cleaning up the water.

The tailing pond water has a high hardness and high silica and sulfate. These materials have been concentrated over the years from the blowdown from the processes. There is a natural inhibitor in the tailing pond water, an organic compound, which serves to prevent sulfates from being precipitated. The use of the steam stripping system 100 serves to reduce the contaminants passed through the system. Because of the high sulfate in the water, magnesium hydroxide does not aid in the removing of silica. As a result, hot water, after steam stripping, is passed over the alumina 106 prior to filtration 108 to remove silica. Silicates are formed and are removed in the filter. In this way, the hardness, some sulfate, and the silica, are reduced prior to reentry into the system or passage back to the tailing pond 62.

The process 10 of the present invention is a totally new concept with several applications. The process of the present invention can be applied as a completely new trona plant which would be much more energy efficient than those in use today. It could also be used in a current plant so as to replace the evaporators. The method of the present invention causes the washing of precipitated carbonates so as to obtain the desired density of carbonate or ash. The alcohol wash allows for the formation of the monohydrate. The heat drying then forms the anhydrous. It has been found that this light ash has been even less dense than the FMC light ash and the crystals are smaller and more uniform in size so that the anhydrous crystals dissolve in solution approximately twenty times faster than the FMC light ash. The slow addition method produces a light ash product which is slightly larger than FMC 100 in crystal size distribution at about the same density.

FIG. 3 shows an alternative embodiment of the process 120 of the present invention. In the process illustrated in FIG. 3, the carbonate-containing solution can pass into the system directly through line 122, from a tailing pond 124, or from other sources 126. An inhibitor 128 is added to the tailing pond solution 124 before or after filter 130. The filter 130 serves to remove organics from the flow streams 122 and 124. Similarly, a filter 132 serves to remove organics from the source 126. The flow from the filter 130 passes through line 132 to a precipitator 134, then to a washer 136, and then to a dryer 138. The water and methanol mixture coming from the precipitator 134 passes through line 140 to the distiller 142. The distiller will serve to distill the water and methanol mixture and pass the distilled mixture through line 146 for use as part of the washer 136. After washing, the methanol passes through line 148 back for use with the precipitator 134.

Importantly, in the embodiment shown in FIG. 3, a three stage precipitator 150 is provided for the filtering of the carbonate-containing solution passing from line 126. In the three stage precipitator 150, a fraction of the methanol is added to each of the stages 152, 154, and 156 of the precipitator 150. The carbonate-containing solution will pass through the stages 152, 154, and 156 of the precipitator 150. The precipitated carbonate passes from each of the stages 152, 154, and 156 so as to pass along line 158 to the washer 136. A vacuum filter 160 acts on the precipitated carbonate so as to separate the water from the precipitated carbonate. The three stage precipitator 150 finds particular application if the inhibitor 128 cannot be applied to the carbonate-containing solution. The multi-stage precipitator 150 allows methanol to be added in small and controllable amounts so as to reduce inclusion and occlusion of impurities when necessary. This also provides for better crystal control, as aggregates arise from large amounts of impurities or rapid crystallization. The slow addition of methanol is important (for any of the embodiments of the present invention) where large amounts of impurities are present in solution or when aggregates are undesirable. The slow addition can also be used to make a light ash product with large crystals. The undesirable salts will pass from the multi-stage precipitator 150 through line 164. For solutions with extremely high amounts of undesirable salts, the crystals from the third stage are washed with a saturated carbonate water solution to remove occulated impurities prior to alcohol wash or the majority of precipitation of the undesirable salts can be in one stage and this stage could be sent to reflux column to remove these impurities when slow addition of methanol still allowed a high inclusion of impurities.

Tests of the present method have indicated superior results over prior systems. Examples of these test results are provided hereinafter.

Referring to FIG. 4, there is shown a wet calcining process 200 of the present invention. The wet calcining process 200 is, in particular, employed for the receipt of dissolved trona directly from the mine. In certain applications, trona can be removed from a mine by flooding the mine. The trona from the mine 202 is passed to a dissolver 204, to a classifier 206, and then to a thickener 208 or a leacher 211. When the dissolved trona passes through the thickener 208, it is filtered by filter 210 and is then delivered to a steam stripper 212.

The steam stripper 212 utilizes outlet steam 214 for the purpose of stripping the carbon dioxide from the trona. Tests conducted on this wet calcining process 200 indicate a quick change for 50% conversion with a few minutes residence time. The kinetics and conversion are controlled by the removal rate of carbon dioxide gas which is being formed and going into solution.

Packed towers or other methods to reduce the liquid film coefficient for carbon dioxide removal from solutions allow about 85% conversion of low steam to solution weight ratio but nearly complete conversion at higher ratios or by using two columns. The removal of carbon dioxide controls this process. It is generally easier to convert bicarbonate crystals to carbonate crystals than bicarbonate in solution to carbonate. In addition, air mixed with steam has been used. The pH in the column is usually reduced to about 8.4, where $NaHCO_3$ and $CO_2$ are the components present, when the best conversion occurs. This usually occurs from partial condensation of the steam which reduces the inlet trona stream. The pH is 11.5 or greater when only $Na_2CO_3$ is present. The pH is between 8.4 and 11.5 when $Na_2CO_3$ and $NaHCO_3$ are present. The pH is between 4.5 and 8.4 when $NaHCO_3$ and $CO_2$ are present. The pH is 4.4 or less when only $CO_2$ is present.

The steam stripper 212 serves to pass steam into intimate contact with the trona-containing solution so as to elevate the temperature of the trona-containing solution. The stripped trona solution then passes through line 216 so as to be appropriately cooled. Carbon dioxide 218 can then be removed form the heated trona solution, if required. This trona solution is then passed to a first precipitator 220. Precipitator 220 is the precipitator for the generation of fine/large crystals. Methanol is provided to the precipitator 220 so as to facilitate the generation of the carbonate crystals. Methanol is provided to the precipitator 220 through line 224. It should be noted that total distillation can be carried out with a dual distillation unit where all the methanol is passed to the precipitators and washers. This would serve some recycling but would require lower energy.

As stated previously, methanol is added to the solution to form a final concentration ranging from approximately fifteen volume percent to approximately seventy volume percent. The carbonate-containing solution can also pass to a second precipitator 226. Methanol is also provided to the second precipitator 226. As was stated previously, the methanol concentration which is provided to the first precipitator 220 and the second precipitator 226 can be of different concentrations. The second precipitator 226 serves to precipitate fine crystals. If, for the purposes of the process 220, it is desired to only produce large crystals, then the fine crystals produced from the precipitator 226 can be recycled back to the first precipitator 220 along with the fluid flow to the first precipitator 220.

The precipitated crystals from the precipitator 220 then pass to a vacuum filter 228. The vacuum filter 228 can serve as the area for the washing of the carbonate crystals. The carbonate crystals can be washed with alcohol in a percentage of between fifty and one hundred volume percent. Additionally, carbonate-saturated water can be introduced to the carbonate crystals. By washing the crystals with the saturated carbonate water, the impurities on the crystals are removed. The carbonate-saturated water 230 is delivered through line 232 to the vacuum filter/wash 228 and also to the second vacuum filter/wash 236. The use of the carbonate saturated water can be used to remove the surface (occlusion) impurities from the surface of the crystals before the methanol was introduced to the crystals in the wash, i.e. the saturated carbonate water serves to remove the impurities from the surface of the crystal. The saturated carbonate water must be saturated with carbonate so as to avoid dissolving the carbonate crystals into the water. As such, this carbonate-saturated water unexpectedly removes the impurities from the carbonate crystals in the vacuum filters 228 and 236.

After washing, the vacuum filters 228 and 236 serve to remove the methanol and the water from the crystals therein. The crystals can then be passed along lines 238 and 240 to the first dryer 242 and the second dryer 244, respectively. The dryers 242 and 244 dry the crystals so as to further remove the water and methanol content therefrom. After drying, the products of the dryers 242 and 244 produce a carbonate product for sale. As stated previously, the atmospheric conditions within the dryers 242 and 244 can be varied if a bicarbonate product is desired.

In the process 200, the water which is removed by the vacuum filters 228 and 236 passes to another steam stripper 246. The output of the steam stripper 246 passes, as a liquid to a filter 248, through alumina 250, and through a filter 252, in the manner described in the previous embodiment of the present invention. This arrangement serves to effectively remove hardness and silica from the water. The resulting filtered water can then be recycled back to the system or passed to a tailing pond.

The high pressure gas and steam output from the steam stripper 236 passes along line 256 to a steam educter 258. This steam, methanol and carbon dioxide combination can then be passed to the inlet of the process 200. A distillation tower 260 is provided so as to receive the methanol products of the process. The distillation tower 260 serves to effectively distill the methanol for use in the system. It is important to note that a dual tower distillation process could also be used.

Figure 5:
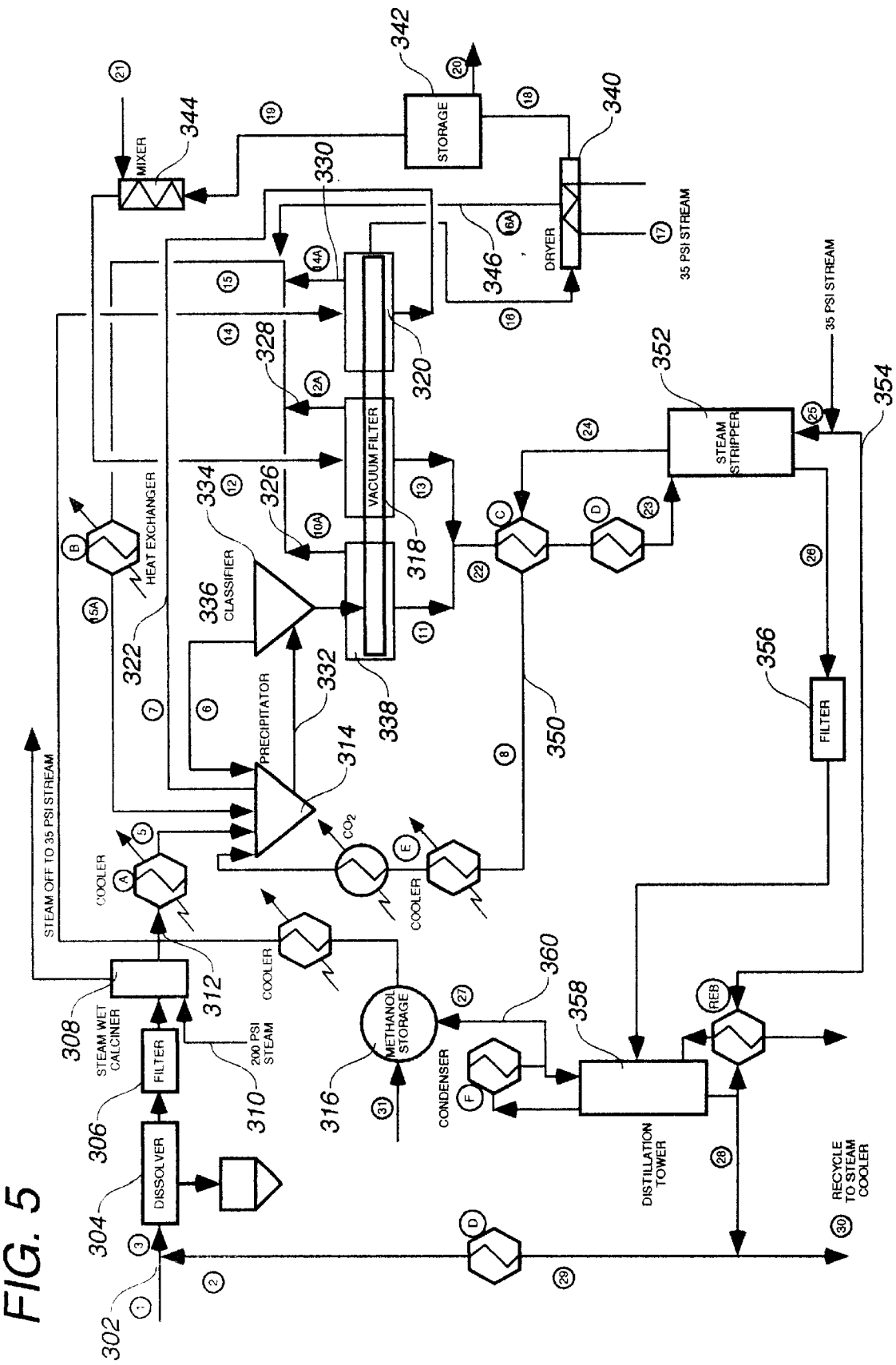
FIG. 5 is a block diagram of the wet calcining process and continuous recycle of the small crystals.

FIG. 5 shows a different version of the process of FIG. 4. The process 300 as shown in FIG. 5 passes a carbonate-containing solution as an input 302 into the process 300. The carbonate-containing solution will pass through a dissolver 304, through a filter 306, and into the steam wet calciner 308. Steam is introduced to the calciner 308 through line 310. In this manner, the trona solution is effectively steam stripped so as to remove the carbon dioxide component and to convert any bicarbonates into carbonates. The carbonate-containing solution passes through outlet 312 to the precipitator 314.

The methanol is maintained in a storage vessel 316. The methanol 316 is delivered, initially, to the vacuum filter 318. In particular, the methanol from the storage unit 316 is delivered to the final stage 320 of the multi-stage vacuum filter 318. The carbonate-containing methanol from the final stage 320 of the vacuum filter 318 then passes as an input, along line 322, to the precipitator 314. Additionally, the gaseous outputs 326, 328, 330 and 346 pass as an input to the precipitator 314. In this manner, methanol is effectively introduced to the carbonate-containing solution in the precipitator 314. The mixture of the methanol, in the controlled amounts described hereinbefore (with a controlled rate of injection), with the carbonate-containing solution in the precipitator 314 will produce carbonate crystals. There can be various methods of injecting the methanol into the carbonate solution. Care should be maintained since supersaturation can occur at the injection, therefore mixing must be accomplished. These carbonate crystals will pass outwardly of the precipitator 314 through line 332 to the classifier 334. Small crystals will then pass along line 336 back to the precipitator 314. As such, the precipitator 314 continually receives the residual methanol from the remainder of the process 300. The classifier 334 delivers the crystals, of a desired size, to the vacuum filter 318. In particular, these crystals pass to the first stage 338 of the vacuum filter 318. In the vacuum filter 338, the crystals can be washed with methanol and with carbonate-saturated water, in the manner described herein previously. The washed carbonate crystals are then delivered, as an output, to the dryer 340. The dryer 340 dries the carbonate crystals through the use of process steam. The resulting carbonate crystals can be delivered to storage vessel 340. Small carbonate crystals will be used to form the saturated solution for the water wash and will pass to a mixer 344. This mixture is appropriately delivered, in the manner described hereinbefore, back to the vacuum filter 318.

The carbonate-saturated water used in the vacuum filter 318 passes to a steam stripper 352. Alternatively, this saturated carbonate solution could be reintroduced into the precipitator 314 if the impurity level is zero. The steam stripper 352 can effectively strip most of the carbon dioxide plus make many of the impurities of calcium and magnesium insoluble. These residual impurities precipitates can be delivered through filter 356. This filter 356 can remove these precipitates and also remove silica (if required) through filter 356. The water is then delivered to a distillation tower 358. The distillation tower 358 will effectively remove the water from the methanol. The methanol can then be delivered along line 360 back to the methanol storage vessel 316. If a dual tower distillation system is used, then the heat requirements of distillation can be reduced. In addition, if steam stripping is not required, then partial distillation could also be used since the methanol used in the precipitators does not have to be a high percent methanol solution.

It is important to note the effectiveness of the process 300 for the manufacture of the carbonate crystals. The following Table II illustrates the input and output products of the process 300. It is important to note that the reference numerals, in circles on FIG. 5, correspond to the reference numerals, identified on Table II, for the inputs and outputs of the process. As stated previously, dual tower distillation would reduce the required heat to the reboiler.

TABLE II

/Hr
2000 #/day $Na_2CO_3$ Product
30% By Weight Solution

|  | Inlet Ore 1 | Recycle $H_2O$ 2 | Dissolver Inlet 3 | MEOH Addition 4 | To Precipitator 5 | Internal Recycle 6 | From MEOH Wash 7 | Recycle from Overhead SS (24) 8 | Feed to Clarifier 9 | To Vaccuum Filters 10 |
|---|---|---|---|---|---|---|---|---|---|---|
| #/hr INERT | 576 | | | | | | | | | |
| #/hr $Na_2CO_3$ | 2222 | 22 | 2444 | 222 | 2222 | 628 | | | | 2111 |
| #/hr $H_2O$ | | 5712 | 5712 | 519 | 5193 | 1469 | 763 | 467 | 8014 | 6345 |
| #/hr MEOH | | | | | | 895 | 2369 | 1478 | 4888 | 3993 |
| TOTAL | 2798 | 5934 | 8156 | 741 | 7415 | 2992 | 3132 | 1965 | 12902 | 12649 |
| ° F. | | 191 | 191 | 191 | 122 | 122 | 122 | 167 | 122 | 122 |
| PSI A | | | | | | | | | | |
| MMBTU/Hr | | | | | | | | | | |

1. HYSIM did not indicate much vapor removal from vacuum filters - numbers assumed
2. Steam stripper and distillation tower was also checked with CHEM CAD III - Different Thermo package - data was close.
3. Recycle of (8–24) (22–23) caused difficulty in automatically converging - 1 ± #/hr.
4.    Water Balance   Methanol Balance           Heat Balance

|  | Water Balance | Methanol Balance | | Heat Balance | |
|---|---|---|---|---|---|
|  | In: #25 | Out #4 | External | In | Out |
|  | In: #21 | Out #20 | In #31   Out #28 | Reb | Cond |
|  |  | Out #30 | Internal | #25 | #20 |
|  | $Na_2CO_3$ |  | In #14   Out #27 | #17 | #30 |

TABLE II-continued

/Hr
2000 #/day $Na_2CO_3$ Product
30% By Weight Solution

In: #1  Out #20  1. MEOH to leave with #31 (none in #2)   #21  H × A
        Out #4   2. $Na_2CO_3$ recycled totally in #2 (none in #31)   H × B
                                                         H × E

|  | Out of Vacuum Filter 11 | $H_2O$ Wash 12 | Out of Vacuum Filter 13 | MEOH Wash 14 | 15* | 10a | 12a | 14a | 16a | Feed to Dryer 16 |
|---|---|---|---|---|---|---|---|---|---|---|
| #/hr INERT |  |  |  |  |  |  |  |  |  |  |
| #/hr $Na_2CO_3$ | 111 | 111 | 111 |  |  |  |  |  |  | 2111 |
| #/hr $H_2O$ | 5737 | 259 | 251 | 71 | 102 | 8 | 8 | 8 | 78 | 100 |
| #/hr MEOH | 3926 | — | 26 | 2474 | 146 | 7 | 7 | 33 | 99 | 99 |
| TOTAL | 9774 | 370 | 388 | 2545 | 248 | 15 | 15 | 41 | 177 | 2310 |
| ° F. | 122 | 122 | 122 | 149 | 122 | 122 | 122 | 122 | 230 | 122 |
| PSI A |  |  |  |  | 7.0 psi |  |  |  |  |  |
| MMBTU/Hr |  |  |  |  |  |  |  |  |  |  |

| | Heat 17 | $Na_2CO_3$ 18 | $Na_2CO_3$ 19 | Prod. $Na_2CO_3$ 20 | $H_2O$ to Mixer 21 | Feed for Recycle-S 1 + 13 22 | Feed to Steam Stripper (8) 23 | Recycle from Top Steam Stripper 24 | Steam In 25 | Water Out of Steam Stripper 26 |
|---|---|---|---|---|---|---|---|---|---|---|
| #/hr INERT |  |  |  |  |  |  |  |  |  |  |
| #/hr $Na_2CO_3$ |  | 2111 | 111 | 2000 |  |  |  |  |  | 222 |
| #/hr $H_2O$ | 174 |  |  | 22 | 259 | 5988 | 5988 | 487 | 758 | 6207 |
| #/hr MEOH |  |  |  |  |  | 3953 | 3952 | 1478 |  | 2475 |
| TOTAL | 174 | 2111 | 111 | 2022 | 259 | 9940 | 9940 | 1965 | 758 | 8904 |
| ° F. | 280 | 230 | 230 | 230 | 122 | 122 | 190 | 190 | 280 | 190 |
| PSI A |  |  |  |  |  |  |  |  | 35 |  |
| MMBTU/Hr | 0.16 |  |  |  |  |  |  |  | 0.911 |  |

| | MEOH Product 27 | Bottoms from Dist. Tower 28 | Re-cycle 29 | Recycle to Steam 30 | MEOH Make-Up 31 | HEAT COND | STREAMS REB | A | B | C | D | E |
|---|---|---|---|---|---|---|---|---|---|---|---|---|
| #/hr INERT |  |  |  |  |  |  |  |  |  |  |  |  |
| #/hr $Na_2CO_3$ |  | 222 | 222 |  |  |  |  |  |  |  |  |  |
| #/hr $H_2O$ | 70 | 6137 | 5712 | 425 |  |  |  |  |  |  |  |  |
| #/hr MEOH | 2474 |  |  | 1 | 1 |  |  |  |  |  |  |  |
| TOTAL | 2544 | 6359 | 5934 | 426 | 1 | 0 | 0 | 0 | 0 |  |  |  |
| ° F. | 149 | 225 | 228 | 225 | 68 |  |  |  |  |  |  |  |
| PSI A |  |  |  |  |  |  |  |  |  |  |  |  |
| MMBTU/Hr |  |  |  |  |  | −3.1 | 3.2 | −0.4 | −0.06 | −0.3 | −0.2 | −0.4 |

*Already Liquid

Figure 6:
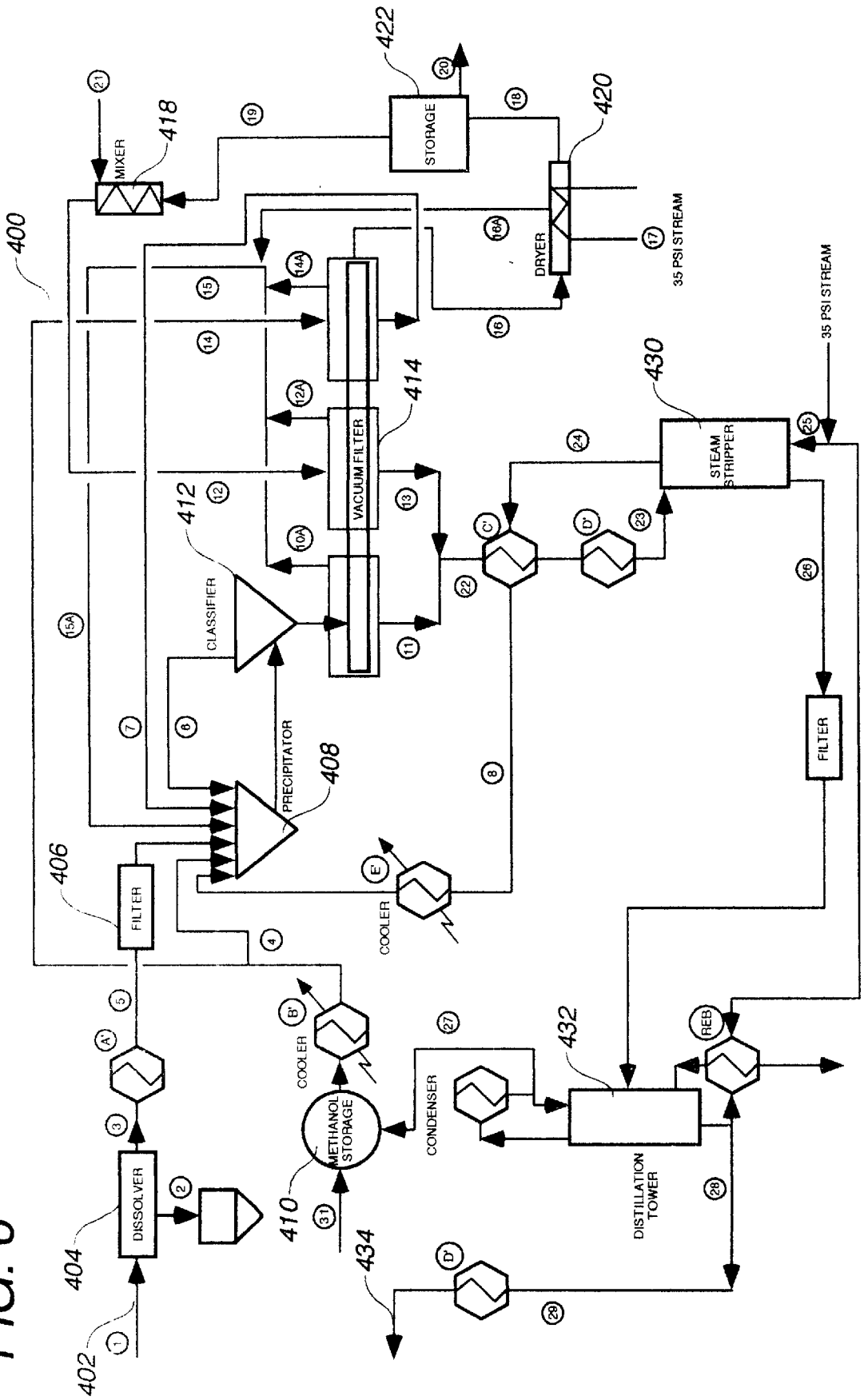
FIG. 6 is a block diagram of an alternative embodiment of the process of the present invention as used with trona tailings in tailing pond water.

FIG. 6 shows a process 400 for the formation of a carbonate product from the tailing pond water. The tailing pond water is an input 402 to the system. The input 402 delivers the tailing pond water to a settling tank 404. The settling tank 404 serves to remove inert materials and particulates from the tailing pond stream 402. The carbonate-containing solution will pass from the settling tank 404 through a filter 406 and into a precipitator 408. The methanol from methanol storage vessel 410 is provided as an input to the precipitator 408 so as to effectively form the carbonate crystals. Additionally, various other methanol inputs, from the process 400, also deliver methanol for reaction with the carbonate-containing solution in the precipitator 408. The resulting carbonate crystals are passed to the classifier 412, in the manner described herein previously. The output of the classifier is delivered to a multi-stage vacuum filter 414 for washing and filtering. The carbonate crystals in the vacuum filter 414 can be washed with methanol and with a saturated carbonate water. The water, which is saturated with carbonate, is provided from the mixer 418. As was described previously, the carbonate crystals pass from the washer 414 to the dryer 420. At the dryer, the methanol and water content of the crystals is effectively removed so that the crystals are suitable for storage at storage tank 422. The by-products from the washing and filtering portion of the process 400 are then passed to the steam stripper 430. These by-products can then be recycled back to the precipitator 408, to a distillation tower 432, or to the outlet 434 of the system 400.

TABLE III illustrates the production of carbonate through the process 400 of FIG. 6. The relationships of carbonate production from the use of water and methanol is noted throughout the process 400. The items identified with circled numerals in FIG. 6 correspond with the production rates under similar numerals in TABLE III. The process 400, to which Table III refers, uses only a single distillation tower.

TABLE III

/Hr
2000 #/day $Na_2CO_3$ Product
15% By Weight Solution

| | Inlet Ore 1 | Recycle $H_2O$ 2 | Dissolver Inlet 3 | MEOH Addition 4 | To Precipitator 5 | Internal Recycle 6 | From MEOH Wash 7 | Recycle from Overhead SS (24) 8* | Feed to Clarifier 9 | To Vaccuum Filters 10 |
|---|---|---|---|---|---|---|---|---|---|---|
| #/hr INERT | | | | | | | | | | |
| #/hr $Na_2CO_3$ | 0 | 0 | 2222 | | 2222 | 628 | | | | 2111 |
| #/hr $H_2O$ | 0 | 0 | 12591 | 120 | 12591 | 1469 | 760 | 746 | 15768 | 14299 |
| #/hr MEOH | 0 | 0 | 0 | 3662 | | 895 | 2369 | 2369 | 9335 | 8440 |
| TOTAL | 0 | 0 | 14813 | 3782 | 14813 | 2992 | 3129 | 3115 | 25103 | 24850 |
| ° F. | | | | 60 | 149 | 122 | 122 | 122 | 166 | 122 | 122 |
| PSI A | | | | | | | | | | |
| MMBTU/Hr | | | | | | | | | | |

1. HYSIM did not indicate much vapor removal from vacuum filters - numbers assumed
2. Steam stripper and distillation tower was also checked with CHEM CAD III - Different Thermo package - data was close.
3. Recycle of (8–24) (22–23) caused difficulty in automatically converging - 1 ± #/hr.
4. Water Balance   Methanol Balance   Heat Balance

```
In: #25    Out #20      External       In      Out
In: #21    Out #28   In #31   Out #28   Reb    Cond
In: #5                Internal          #3     #20
Na2CO3              In #4    Out #27   #17    #29
In: #5     Out #20            In #14   #21    H x B
           Out #28                     #25    H x E
                                              H x A
```

| | Out of Vacuum Filter 11 | $H_2O$ Wash 12 | Out of Vacuum Filter 13 | MEOH Wash 14 | 15* | 10a | 12a | 14a | 16a | Feed to Dryer 16 |
|---|---|---|---|---|---|---|---|---|---|---|
| #/hr INERT | | | | | | | | | | |
| #/hr $Na_2CO_3$ | | 111 | | | | | | | | 2111 |
| #/hr $H_2O$ | 13491 | 251 | 251 | 68 | 102 | 8 | 8 | 8 | 78 | 100 |
| #/hr MEOH | 8373 | 26 | 26 | 2474 | 1445 | 7 | 7 | 33 | 99 | 99 |
| TOTAL | 21864 | 388 | 277 | 2542 | 1548 | 15 | 15 | 41 | 177 | 2310 |
| ° F. | 122 | 122 | 122 | 149 | 122 | 122 | 122 | 122 | 230 | 122 |
| PSI A | | | | | 7.0 psi | | | | | |
| MMBTU/Hr | | | | | | | | | | |

| | Heat 17 | $Na_2CO_3$ 18 | $Na_2CO_3$ 19 | Prod. $Na_2CO_3$ 20 | $H_2O$ to Mixer 21 | Feed for Recycle-S 1 + 13 22 | Feed to Steam Stripper (8) 23 | Recycle from Top Steam Stripper 24 | Steam In 25 | Water Out of Steam Stripper 26 |
|---|---|---|---|---|---|---|---|---|---|---|
| #/hr INERT | | | | | | | | | | |
| #/hr $Na_2CO_3$ | | 2111 | 111 | 2000 | | | | | | 222 |
| #/hr $H_2O$ | 174 | | | 22 | 259 | 13742 | 13742 | 746 | 1500 | 14496 |
| #/hr MEOH | | | | | | 8399 | 8399 | 3263 | | 6136 |
| TOTAL | 174 | 2111 | 111 | 2022 | 259 | 22141 | 22141 | 4009 | 1500 | 20854 |
| ° F. | 280 | 230 | 230 | 230 | 122 | 189 | 189 | 192 | 280 | 190 |
| PSI A | | | | | | | | | | |
| MMBTU/Hr | 0.16 | | | | | | | | 1.8 | |

| | MEOH Product 27 | Bottoms from Dist. Tower 28 | Recycle 29 | MEOH Make-Up 31 | COND |
|---|---|---|---|---|---|
| #/hr INERT | | | | | |
| #/hr $Na_2CO_3$ | | 222 | 222 | | |
| #/hr $H_2O$ | 167 | 14329 | 14329 | | |
| #/hr MEOH | 6135 | 1 | 1 | 1 | |
| TOTAL | 6302 | 14552 | 14552 | 0 | 0 |
| ° F. | 149 | 225 | 197 | 68 | |
| PSI A | | | | | |
| MMBTU/Hr | | | | | −8.0 |

*Already Liquid

Production of Carbonate Crystals from Calcined Trona or Sodium Carbonate Solutions As previously stated, Table 1 indicates typical commercial products that are available on the market. The methanol process of the present invention is used for the formation of carbonate crystals which can mirror the typical commercial products. In general, in the methanol process, the methanol absorbs water and concentrates the ions in the remainder of the water. When the solution is saturated or slightly supersaturated (with reference to the carbonate ion), then carbonate precipitation occurs. Fast addition (approximately ten minutes residence time between the methanol and the carbonate solution) has a high supersaturation, while slow addition (up to 100 minutes residence time) is only slightly supersaturated.

Figure 9:
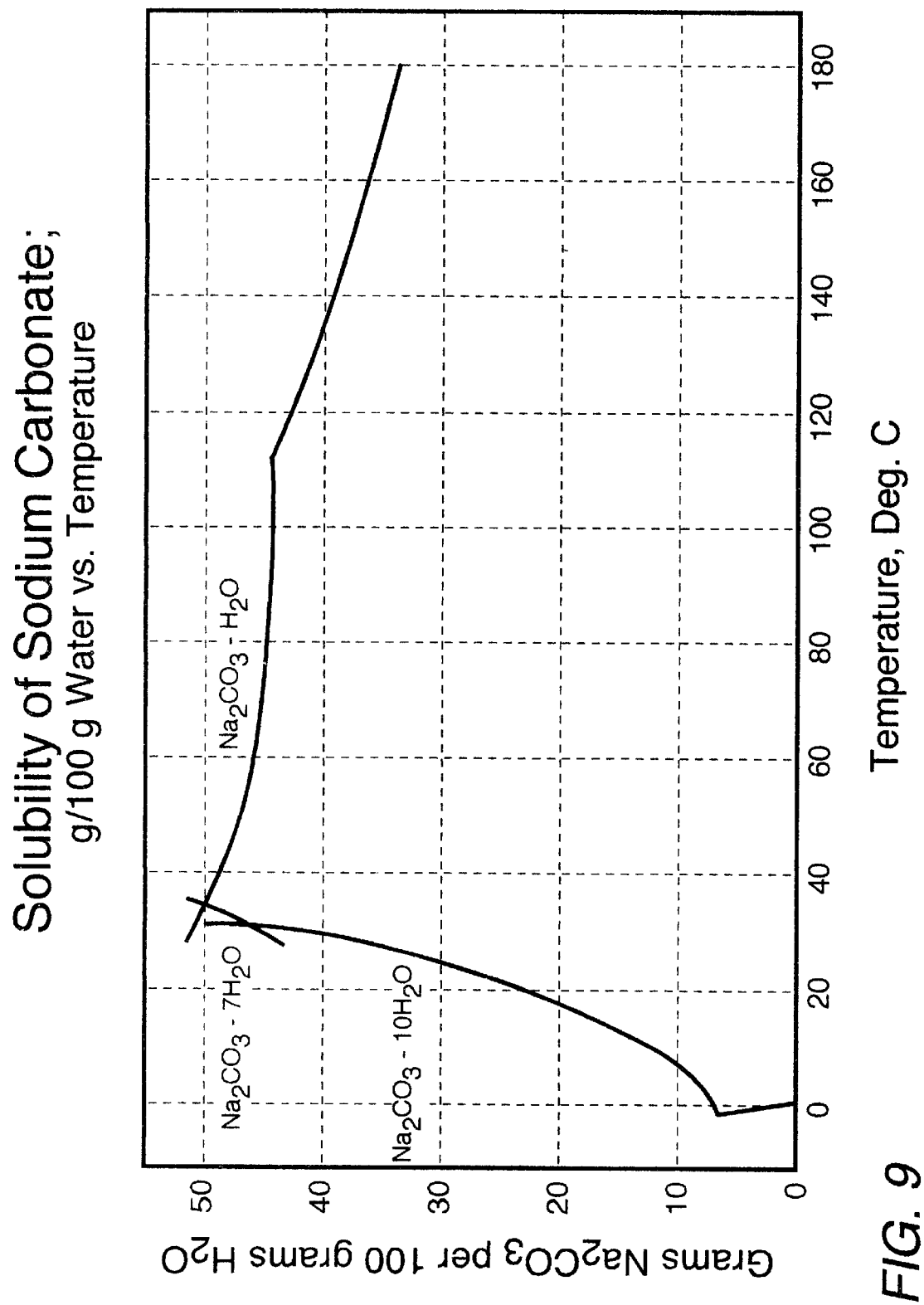
FIG. 9 is a graph of the solubility of sodium carbonate in water.

FIG. 9 shows the solubility of sodium carbonate in water. The process of the present invention can be applied to a saturated solution of sodium carbonate from saturation (approximately 450 g/l) to 300 g/l at 82° C. (180° F.). If calcined trona is used in the process, then the sodium bicarbonate content of the solution will depend on how complete the calcining is. In general, in the process of the present invention with sodium carbonate solutions, the amount of sodium bicarbonate can vary from near 0 to about 50 g/l.

Figure 8:
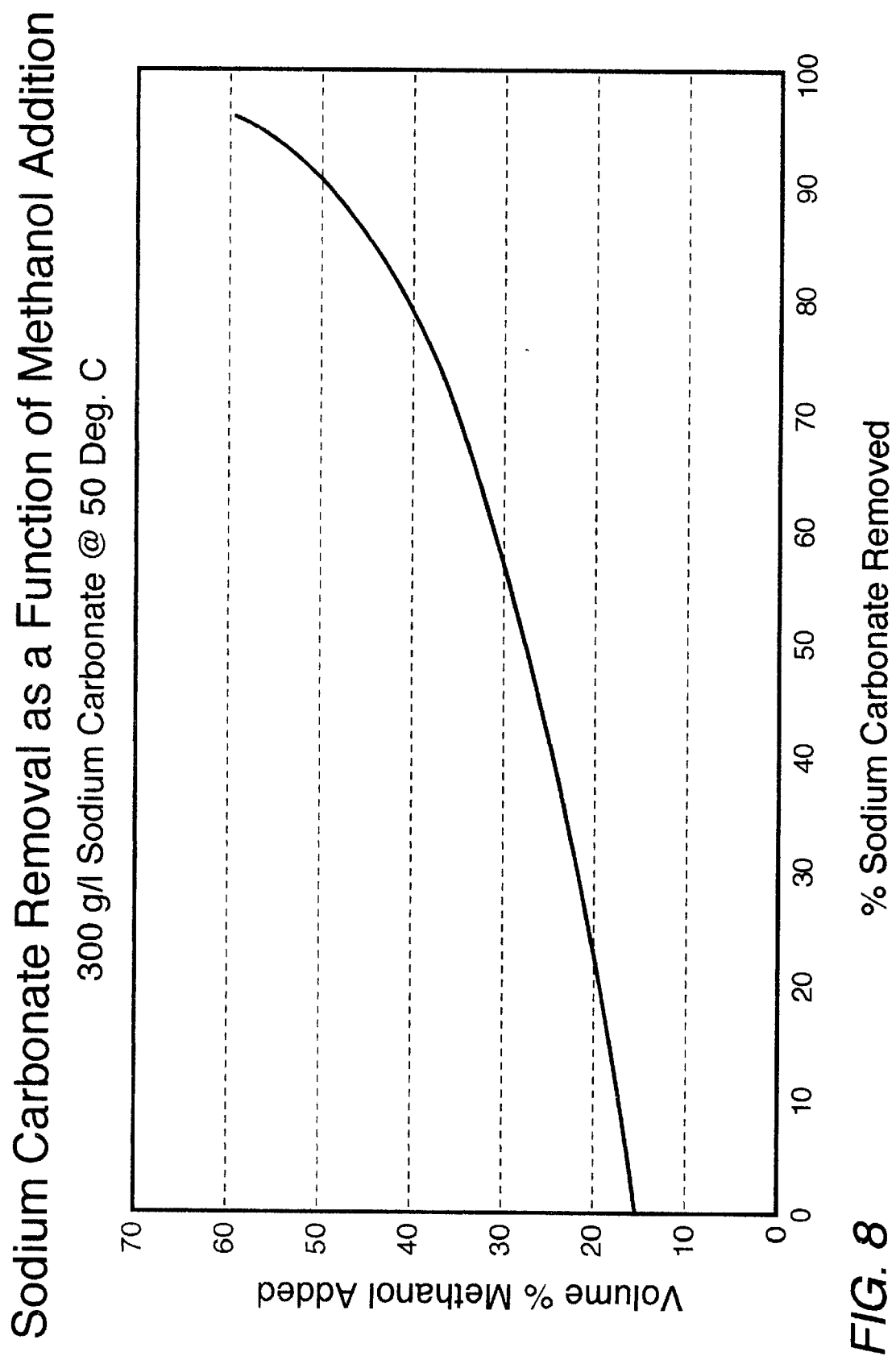
FIG. 8 is a graph of sodium carbonate removal as a function of methanol addition.

FIG. 8 illustrates the methanol concentration required for sodium carbonate recovery for an initial 300 g/l carbonate solution. As can be seen on the graph of FIG. 8, no recovery is obtained below 15% by volume methanol (the final solution percent). Economically, the recovery for a 300 g/l solution is between 50 to 100% recovery from 30 to 70% volume methanol. A 50% methanol volume in the final solution produces about 90% recovery. This is believed to be the most optimal and economic with respect to the cost of energy.

Figure 7:
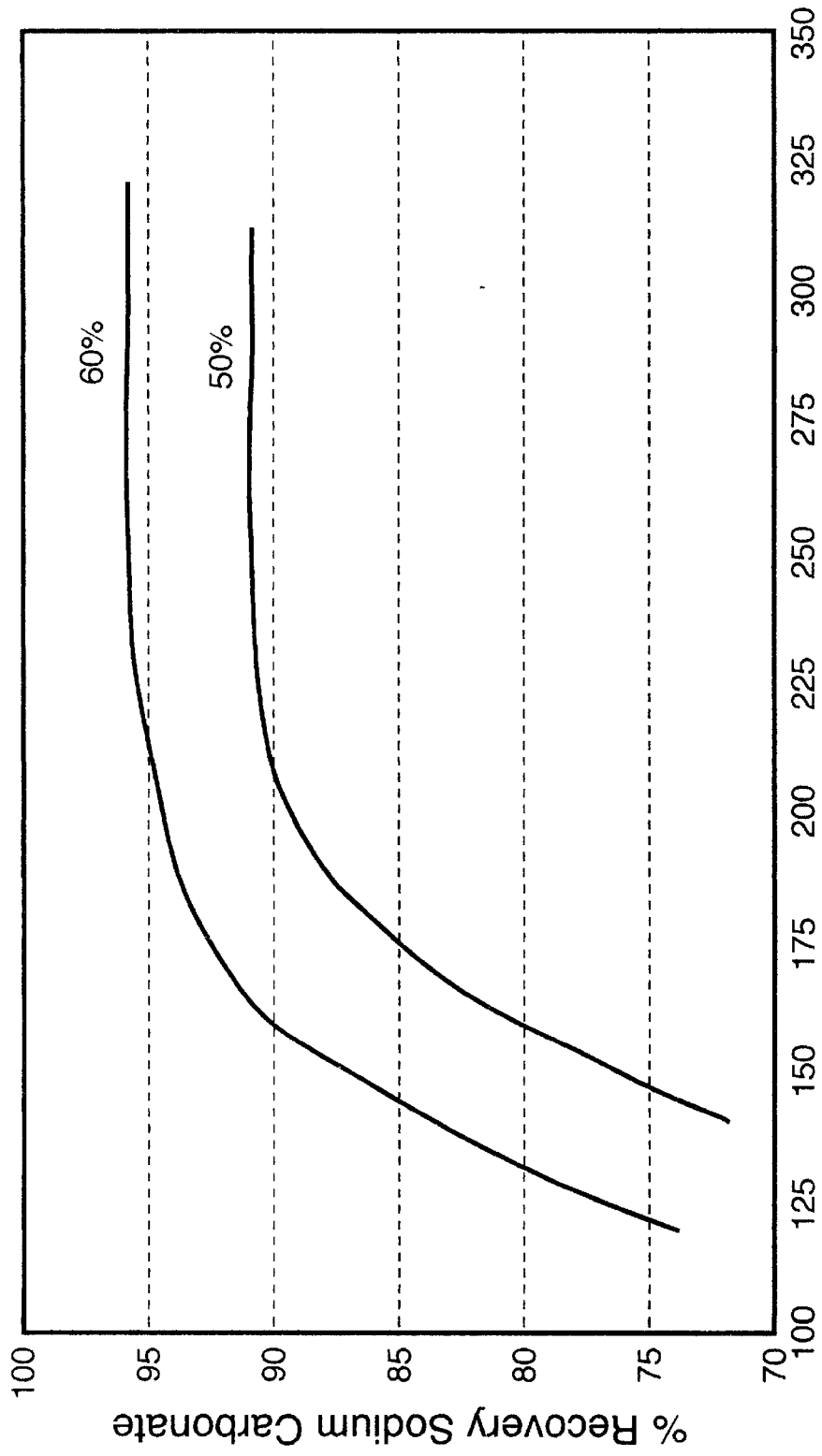
FIG. 7 is a graph showing sodium carbonate recovery as a function of initial sodium carbonate concentration and as a function of methanol volume percent.

FIG. 7 shows the sodium carbonate recovery using 50% methanol and 60% methanol for various initial sodium carbonate concentrations. At 50°C., the lower the initial sodium carbonate concentration, the less recovery which is obtained for a given methanol concentration. Since the amount of energy per gallon of methanol for distillation is the same for any given methanol concentration, it is generally not economical to work with solutions below 100 to 125 g/l of sodium carbonate. For example, recovery with the 50% methanol solution becomes less economic with 70 to 80 g/l carbonate solution compared to 350 g/l carbonate solution with the same methanol concentration since the energy for distillation is the same but less product is available for sale.

The crystal shape and size are primarily controlled by the residence time and the recycle of the mixed solution. The total methanol concentration is a secondary effect on the crystal size. In the process of the present invention, it has been found that the higher the methanol concentration, the smaller the crystals. Also, mixing shear can have effect on crystal shape and size. Large crystals are produced from an initial methanol concentration of 20% to 50% volume in the final solution. Smaller crystals are produced from a 50% to 70% final methanol concentration.

When the methanol and the carbonate-containing solution are mixed together with about 10 minutes residence time (fast addition), small crystals are formed. Impurities are trapped by this method and must be washed and/or the crystals must be separated and recycled. When the methanol and the carbonate-containing solution are mixed together with about 100 minutes residence time (slow addition), large rod-shaped crystals are formed. The recycle step is extremely important in order to obtain the large size of crystals. Additionally, the stirring rate is also important. The stirring rate must be sufficient to obtain the recycle of the crystals, but not so great so as to cause attrition on the crystals. It has been found that a slow mixing rate results in star-shaped crystals which are not as sturdy as rod-shaped crystals. The slow addition of methanol also limits the impurities in the crystals. As a result, particle shape and size are controlled by residence time and recycle with total methanol concentration.

The washing of the filtered crystals with water removes some of the surface impurities, as described hereinbefore. When the filtered crystals are washed with mixtures of methanol and water ranging from 50% up to 100% methanol, the dried crystal density is affected. There is no noticeable effect on crystal density when methanol solutions of below 50% are used in the washing step. When a 50% methanol wash is used, the crystals become dense when compared to a 100% methanol wash. The density varies from dense to light as the methanol percentage is increased. It has been found that the density change is not due to simple water removal. It has been found that at a given methanol concentration in the wash, there is a limit to the water removal from the crystal even with large volume ratios of wash volume to crystal volume. The water/methanol concentration contained within the crystals after a wash can vary for a given wash percentage depending upon the volume of the wash. However, the final density of the crystals after drying will be essentially identical using the same alcohol percentage in the wash. Thus, the final density of the crystal can be controlled by the concentration of the methanol wash from 50% to 100% methanol.

The process of the present invention allows crystal size and crystal density to be customized through the control of the various mixing rates and wash concentrations. The crystals resulting from slow addition are similar to FMC 100 while the crystals from fast addition of methanol are similar to FMC 260. Table 4 shows the test results based upon various parameters of methanol concentration, the residence time, and the alcohol concentration in the wash.

In Table 4, it can be seen that large rods are produced by the slow addition for both 40% and 50% methanol. The speed of addition of the 50% methanol with a 100 minute retention time provides the largest crystals. The fast addition for 50% methanol is also shown. These are small long rods. The fast addition does not indicate much change with methanol addition rates.

TABLE 4

| Solution ID Source | Batch RP Pilot | T-11 | T-11 | T-11 | T-11 | T-11 | T-11 | RP Pilot |
|---|---|---|---|---|---|---|---|---|
| MeOH Ad' rate | Slow Addition | Slow Addition | Slow Addition | Slow Addition | Slow Addition | Fast Addition | Fast Addition | Simultaneous |
| Pretreatment | | Carbon Filtered | Carbon | Carbon Filtered | Carbon | Carbon | Carbon | |
| Pretreatment | | Classifier | Filtered | Classifier Continuous | Filtered | Filtered | Filtered | |
| Final MeOH % | 40% MeOH | 50% MeOH | 50% MeOH | 50% MeOH | 50% MeOH | 50% MeOH | 50% MeOH | 53% MeOH |

TABLE 4-continued

| Solution ID Source | Batch RP Pilot | T-11 | T-11 | T-11 | T-11 | T-11 | T-11 | RP Pilot |
|---|---|---|---|---|---|---|---|---|
| MeOH Feed Rate | 0.1 gpm/ 80 min | 0.12 gpm/ 100 min | 0.16 gpm/ 100 min | 0.26 gpm/ 100 min | 0.4 gpm/ 100 min | 0.63 gpm/ 90 min | 0.8 gpm/ 105 min | 0.69 gpm/ 13 min |
| MeOH Feed Rate Initial Volume | 0.01 | 0.01 | 0.01 | N/A | 0.01 | N/A | N/A | N/A |
| Crystal Density (lb/ft3) | 51.4 | 50.8 | 52.6 | 61.7 | 45.5 | 42.0 | 44.7 | 41.9 |
| Size Dist. | | | | | | | | |
| 1000 u | 1.0 | 0.2 | TR | TR | TR | 0.1 | 0.2 | — |
| 850 u | 2.0 | 4.0 | 0.3 | TR | TR | TR | TR | 0.0 |
| 600 u | 2.5 | 7.7 | 44.3 | 4 | TR | 0.1 | TR | — |
| 420 u | 18.1 | 24.4 | 18.0 | 17.6 | 22.0 | 0.8 | 0.6 | 6.4 |
| 300 u | 22.4 | 17.5 | 19.6 | 10.6 | 37.0 | 3.8 | 3.5 | — |
| 212 u | 20.5 | 18.9 | 17.0 | 9.2 | — | 13/0 | 10.2 | 9.6 |
| 150 u | 16.7 | 13.2 | 15.1 | 15.4 | 24.0 | 27.0 | 19.6 | — |
| 106 u | 17.0 | 6.4 | 8.3 | 18.9 | 14.0 | 24.6 | 26.5 | 40.9 |
| 75 u | 4.2 | 2.8 | 5.6 | 15 | 3.5 | 14.2 | 25.6 | — |
| 45 u | 3.5 | 2.1 | 6.6 | 6.7 | — | 16.4 | 11.6 | 26.0 |
| <45 u | 2.1 | 2.0 | 5.2 | 2.6 | — | — | 2 | — |
| Not Screened | X | X | X | X | X | X | X | X |
| Absorpitivity % | 13.2 | 17.5 | 16.2 | 15.1 | 16.2 | 22.2 | 17.6 | 20 |
| Sulfate ppm | 500 | 600 | 600 | 750 | 700 | 13000 | 1500 | 1700 |
| TOC | 120 | 94 | 84 | 130 | 74 | 156 | 115 | 662 |
| Crystal Morphology | Large Rods FMC 100 | Large Rods FMC 100 | Large Rods FMC 100 | Large Rod FMC 100 | Large Rods FMC 100 | Long/small/rods FMC 160 | Long/small/ rods FMC 160 | Small rods/balls FMC 160 |
| Feed Positions | MEOH - top H2O - top | MeOH - top (90° F.) | MeOH - top | MeOH - Inner Baffle Recycle - Inner Baffle | MeOH - top | MeOH - top H2O - bottom | MeOH - top | MeOH - top H2O - bottom |
| Wash | 50/50 | | | | 50/50 | 50/50 | 50/50 | 50/50 |
| Solution | 100% | 100% | 100% | 100% | 100% | 100% | 100% | 100% |
| Date | 4/21/95 | 8/1/95 | 7/31/95 | 8/17/95 | 7/28/95 | 7/24/95 | 7/26/95 | 6/28/95 |

Tailing Pond Water

It has been found that the use of the process of the present invention on tailing pond water forms crystals similar to RP Lite (see Table 1) with slow addition. The fast addition of methanol produces crystals which are similar to the Synthetic General Chemical (see Table 1).

The tailing pond water is generally about 130 g/l of sodium carbonate with about 12 g/l of sodium bicarbonate with the precipitated decahydrate separated. The tailing pond water does not start recovery of carbonate until the methanol concentration is at least 40% at 50° C. (122° F.). When the decahydrate crystals are added back into the tailing pond water, the concentration is more nearly 380 g/l of sodium carbonate and 50 g/l of sodium bicarbonate. Both tailing pond water without the decahydrate crystals and with the decahydrate crystals have been tested. The crystals formed are nearly identical in both cases. Only the amount of recovery varies. A methanol concentration above about 15% at 50° C. initiates precipitation for the solution with the decahydrate crystals mixed with the water.

In order to generate an economical recovery of nearly 90% of the sodium carbonate from the tailing pond water (without the decahydrate crystals) requires about 70% methanol final volume concentration. When the decahydrate crystals are added, a recovery of 90% or greater is achieved from the use of 50% final volume methanol concentration.

It is important to note that one problem occurs with the use of tailing pond water. The tailing pond water contains nearly 5000 ppm (5 g/l) of sulfate ions. When a 50% final volume methanol concentration is used, the sulfate does not become supersaturated, but is near saturation. However, at 70% final volume concentration of methanol, as shown in Table 5, the sulfate becomes supersaturated and the sulfate level in the crystals greatly increases. Thus, recovery of tailing pond water should be limited to approximately a 50% final volume methanol in order to control the sulfate level.

It has also been found that the residence time in the reaction vessel affects the sulfate concentration in the crystals as well as the crystal shape and size. Fast addition of methanol increases the sulfate concentration trapped within the crystals and creates small crystals. It has been found that the sulfate also serves as a crystal modifier. Sulfate will produce round balls instead of rods. It has been found that the mixing rate has less of an effect on the round ball-shaped crystals as it does on the rod-shaped crystals. However, the effect is still noticeable. The control of density is the same as described in conjunction with the previous sodium carbonate solution.

Table 5 provides test results showing tailing pond water with slow addition at 50% and at 90% final volume methanol concentration. It is difficult to determine much difference in particle size between the pictures of Table 5. Analysis of the particles did indicate that the faster the addition, the more sulfate was trapped in the particles. The fast addition

TABLE 5

| | Tailings Pond | | | |
|---|---|---|---|---|
| Solution ID Source | Pond | Pond | Pond | Pond |
| MeOH Ad' rate | Slow Addition | Slow Addition | Slow Addition | Fast Addition |
| Pretreatment | Carbon Filtered | Carbon Filtered | Carbon Filtered | Carbon Filtered |
| Pretreatment | Classifier | Classifier Continuous | Classifier | Classifier Continuous |
| Final MeOH % | 50% MeOH | 70% MeOH | 70% MeOH | 70% MeOH |

TABLE 5-continued

| | Tailings Pond | | | |
|---|---|---|---|---|
| Solution ID Source | Pond | Pond | Pond | Pond |
| MeOH Feed Rate | 0.05 gpm/ 110 min | 0.26 gpm/ 100 min | 0.5 gpm/ 100 min | 1.0 gpm/ 10 min |
| MeOH Feed Rate Initial Volume | 0.01 | N/A | 0.03 | N/A |
| Crystal Density (lb/ft3) | 56.0 | 66.7 | 65.4 | 66.1 |
| Size Dist. | | | | |
| 1000 u | 0.3 | 0.1 | 0.2 | 0.3 |
| 850 u | 3.7 | 0.1 | 0.1 | 0.3 |
| 600 u | 7.1 | 0.3 | 1.0 | 1.0 |
| 420 u | 16.8 | 7.5 | 28.1 | 9.4 |
| 300 u | 25.3 | 36.4 | 16.9 | 7.8 |
| 212 u | 30.0 | 25.8 | 16.1 | 3.0 |
| 150 u | 12.9 | 14.9 | 16.3 | 3.4 |
| 106 u | 3.2 | 4.5 | 16.5 | 6.5 |
| 75 u | 0.6 | 2.5 | 2.8 | 32.8 |
| 45 u | TR | 3.8 | 8.4 | 24.9 |
| <45 u | TR | 4 | 6.6 | 10.6 |
| Not Screened | X | X | X | X |
| Absorpitivity % | 17.5 | 17.6 | 16.2 | 16.2 |
| Sulfate ppm | 3100 | 6600 | 16500 | 18100 |
| TOC | 398 | 206 | 308 | 315 |
| Crystal Morphology | Dog bone/ popcorn larger RP lite | Popcorn larger RP lite | Popcorn larger RP lite | Small popcorn General |
| Feed Positions | MeOH - top (90° F.) | MeOH - Inner Baffle H2O - top Recycle - Inner Baffle | MeOH - top | MeOH - Inner Baffle H2O - mixed Recycle - Inner Baffle |
| Wash Solution | 100% | 100% | 100% | 100% |
| Date | 8/4/95 | 8/14/95 | 8/9/95 | 8/15/95 | particles are small spherical crystals with high sulfate content.

Sesquicarbonate or Uncalcined Trona

Figure 13:
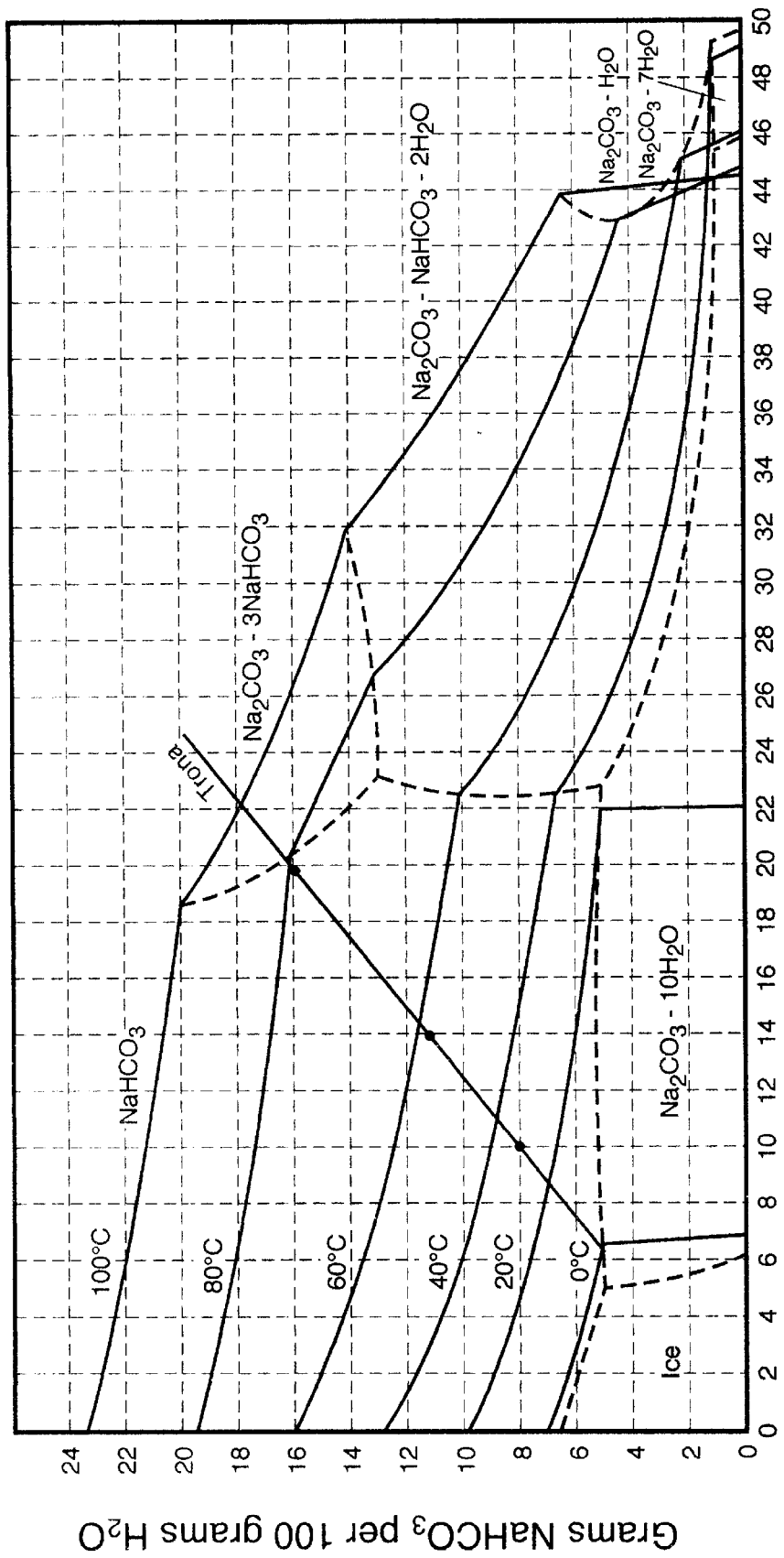
FIG. 13 is a graph of sesquicarbonate precipitations with a trona solubility line.
Figure 14:
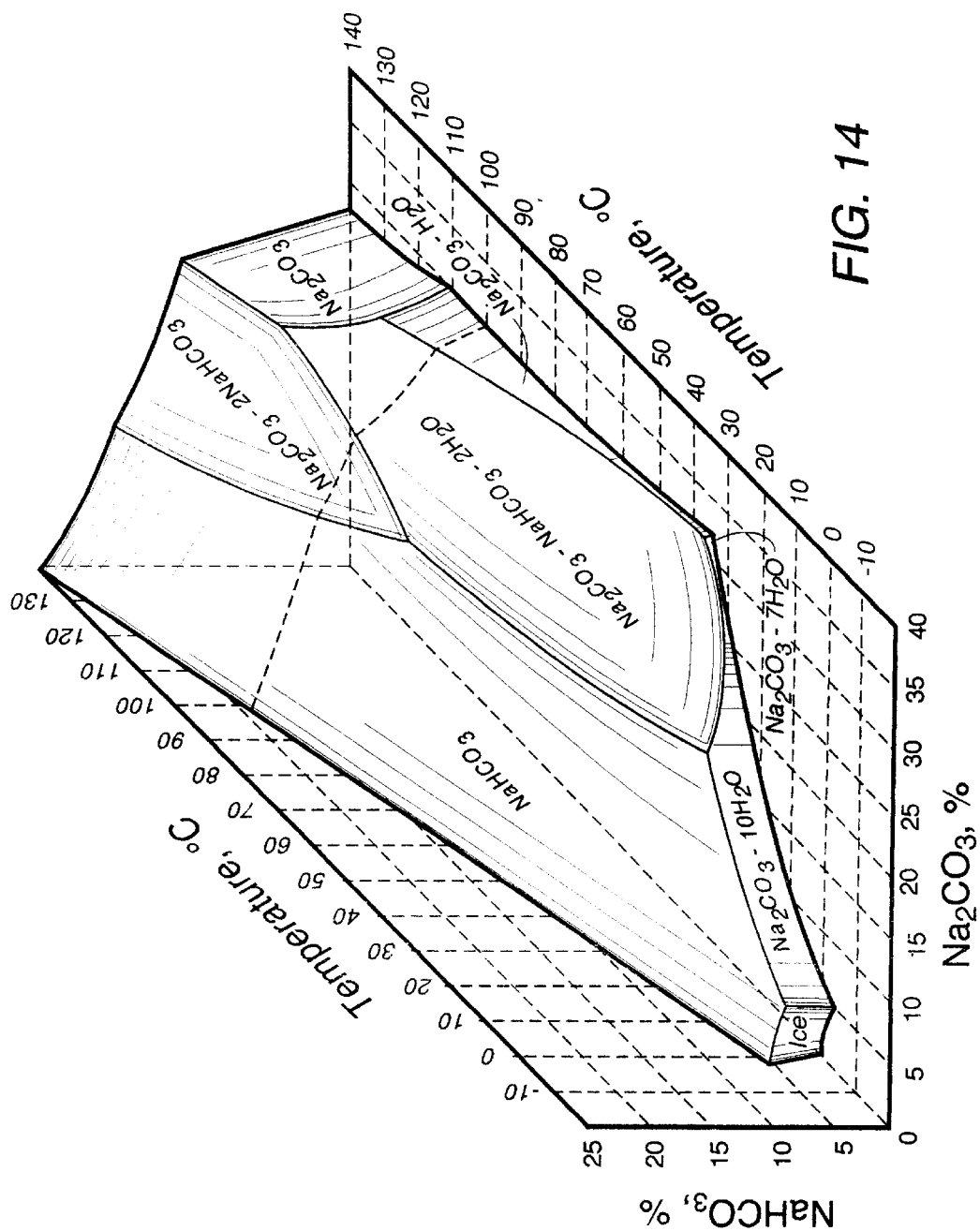
FIG. 14 is a three-dimensional phase diagram for uncalcined trona.

FIG. 13 is a solubility curve for sesquicarbonate. In particular, a line showing sesquicarbonate solubility is provided on the graph of FIG. 13. The region for precipitation of the sesquicarbonate crystal is to the right of the solubility curve. FIG. 14 is a phase diagram with respect to sesquicarbonate.

Uncalcined trona is made from one mole of sodium carbonate, one mole of sodium bicarbonate and two moles of water. The solubility increases with temperature and does not have the inverse solubility at higher temperatures which sodium carbonate would indicate. The solubility at 50° C. (120° F.) is 120 g/l of sodium carbonate and 100 g/l of sodium bicarbonate. This can vary somewhat in the equilibrium obtained since the trona goes into solution slower than sodium carbonate or calcined trona. Another variable which will change the equilibrium of the reaction is the pH of the solution.

As mentioned previously, trona is an incongruently dissolving double salt. Upon precipitation, sodium bicarbonate will precipitate first, not the sesquicarbonate crystals. With reference to FIG. 14, it is important to get within the region of sesquicarbonate as indicated in the attached 3-D phase diagram. The carbonate level must be increase and the bicarbonate level decrease. This can be done in several ways. First, the sesquicarbonate can be dissolved in an approximately 200 g/l sodium carbonate solution. Alternatively, the sesquicarbonate can be dissolved in fresh water and then blended about 50/50 with a 400 g/l sodium carbonate solution. Thirdly, it is possible to adjust the pH with a caustic either by adding caustic or dissolving the sesquicarbonate in a caustic solution. As can be seen in FIG. 14, it is possible to get within the carbonate range by caustic addition.

The precipitation of the sesquicarbonate solution at its solubility in fresh water would be outside the area of the sesquicarbonate precipitation area. In this area, sodium bicarbonate will precipitate initially and slowly change the equilibrium such that nearly all bicarbonate is precipitated unless one of the previously-described steps are taken. As a result, it is important to get within the sesquicarbonate or carbonate area of precipitation or else bicarbonate will precipitate. Within the sesquicarbonate crystal precipitation area or the carbonate range, large rods are obtained from the precipitation. If, by mistake, precipitation is made within the bicarbonate range, then the pH can be adjusted and the precipitated crystals will change to rods. The residence time of the methanol with the sesquicarbonate appears to make small rods attach to larger rods. With a greater amount of recycle, these tend to grow to individual rods.

Table 6 shows test results resulting from the process of the present invention as applied to sesquicarbonate/bicarbonate and carbonate mixtures. These examples were carried out at different rates and were adjusted with caustic to get within the

TABLE 6

| | Sesquicarbonate/Bicarbonate and Carbonate Mixture | | | | |
|---|---|---|---|---|---|
| Solution ID Source | Natural Trona Uncalcined | Natural Trona Uncalcined 2000 ppm | Uncalcined Trona | Uncalcined Trona | Uncalcined Trona & TK-11 |
| MeOH Ad' rate | Slow Addition | Slow Addition | Slow Addition | Slow Addition | Slow Addition |
| Pretreatment | | | | Filtered | |
| Pretreatment | | | Classifier Continuous | Classifier Continuous | Classifier Continuous |
| Final MeOH % | 45% MeOH | 50% MeOH | 45% MeOH Caustic Precipitation 11.06 | 50% MeOH Caustic 11.5 | 50% MeOH Caustic 11.15 |
| MeOH Feed Rate | 5 ml/min/100 min | 8 ml/min/100 min | .2 gpm/100 min | 1.9 ml/min 90 min | |
| MeOH Feed Rate Initial Volume | 0.01 | 0.01 | 0.01 | | N/A |
| Crystal Density (lb/ft3) | 11 | 11.4 | 58.3 | 53.7 | 45.7 |

TABLE 6-continued

Sesquicarbonate/Bicarbonate and Carbonate Mixture

| Solution ID Source | Natural Trona Uncalcined | Natural Trona Uncalcined 2000 ppm | Uncalcined Trona | Uncalcined Trona | Uncalcined Trona & TK-11 |
|---|---|---|---|---|---|
| Size Dist. | | | | | |
| 1000 u | | | 0.8 | 1.6 | 14.9 |
| 850 u | | | 8.3 | 29.3 | 23.3 |
| 600 u | | | 27.6 | 21.6 | 19 |
| 420 u | 4.5 | 0.35 | 21.5 | 13.2 | 18.4 |
| 300 u | | | 11.2 | 12.3 | 6.9 |
| 212 u | 17.3 | 1 | 12.1 | 9.7 | 5.7 |
| 150 u | | | 10.9 | 9 | 3.2 |
| 106 u | 20.6 | 1.6 | 4.6 | 2.4 | 2.3 |
| 75 u | | | 1.6 | 0.7 | 1.9 |
| 45 u | 28.1 | 27.2 | 0.9 | 0.2 | 1.5 |
| <45 | 29.5 | 69.8 | 0.5 | TR | 0.9 |
| Not Screened | X | X | X | X | X |
| Absorpitivity % | | | 5.1 | 18.8 | 25.3 |
| Detergency % | 49.5 | 42.6 | | | |
| Sulfate ppm | 152 | 2096 | 1200 | 1600 | 2400 |
| TOC | n/a | n/a | 191 | 120 | 101 |
| Crystal Morphology | Small Needles | Small Needles | Balls & Rods | Rods | Rods |
| Feed Positions | n/a | n/a | MeOH - Inner Baffle Recycle - Inner Baffle | MeOH - Top Funnel Small Batch of Needles | |
| Wash | | | | | |
| Solution | 100% | 100% | 100% | 100% | 100% |
| Date | 11/1/94 | 11/1/94 | 11/7/95 | 11/7/95 | 11/8/95 | required ranges of sodium bicarbonate and sodium carbonate concentrations required for sesquicarbonate crystal precipitation. One of the examples mixed sodium carbonate solution at nearly 500 g/l with a sesquicarbonate solution made with fresh water. This resulted in sodium carbonate of 385 g/l and sodium bicarbonate of 35 g/l. The solutions were not recycled and had large rods with small rods on the surface. So as to produce sodium bicarbonate as a final product, the drying could be done in a carbon dioxide atmosphere.

Mixtures of Carbonate and Bicarbonate

Various mixtures of bicarbonate and carbonate are mixed so as to determine the range which can produce various crystals. The methanol concentration to achieve precipitation is dependent upon the total concentration of each of sodium bicarbonate and sodium carbonate, the ratio of sodium carbonate to sodium bicarbonate in the mixture, and the temperature. The concentration to cause precipitation is also affected by the presence of any crystals in the solution. The precipitation often occurs at a slightly lower concentration if there are already crystals which exist to form upon. Conversely, the crystals formed after precipitation are mainly dependent upon the ratio of carbonate to bicarbonate with the size still affected by the final methanol concentration. Residence time and mixing shear only has a slight effect on the crystal shape and size.

As an example, at a 0.2 to 1 mole ratio (28 g/l of sodium carbonate and 88 g/l of sodium bicarbonate), a 30% methanol final volume percent will not cause precipitation at 50° C. (122° F.). However, 50% methanol will cause precipitation. Decreasing the temperature to 30° C. does, however, allow precipitation. Thus, the total concentration (the degree of saturation), the ratio of the sodium carbonate and the sodium bicarbonate and the temperature appear to be factors in the solubility of the sodium carbonate and sodium bicarbonate when adding methanol.

Another test carried out with the process of the present invention utilized a ratio of 2 to 1 mole ratio (110 g/l of sodium carbonate and 35 g/l of sodium bicarbonate). This test showed that precipitation occurred with 30% methanol at 50° C.

Individual precipitation curves of pure sodium carbonate and sodium bicarbonate generated by adding methanol do not predict mixed solubilities. For example, using the individual curves to predict the precipitation of the 0.2 to 1 mole ratio of sodium carbonate to sodium bicarbonate with 30% methanol does not work. The individual curves predict that 88 g/l of bicarbonate will precipitate but the 28 g/l of sodium carbonate will not precipitate. In actual tests carried out, the mixture did not precipitate. Since the sodium carbonate and sodium bicarbonate solubility curves were made from saturated solutions and the remaining species in solution measured, the mixed solubility is probably the largest factor. Another influence would be any crystals remaining in solution when generating the individual curves.

Mole ratios of carbonate to bicarbonate of 10 to 1 through 0.1 to 1 have been run. Mole ratios of sodium carbonate to sodium bicarbonate from 10.0 to 5.0 can be handled as normal sodium carbonate solutions. Mole ratios of 5.0 to 1.0 must be treated as if they were sodium sesquicarbonate solutions. Solution mining can be within the region covered by the above tests. Wet calcining can also be used to convert much of the bicarbonate to carbonate. The steam would provide the heat and the gas to strip the carbon dioxide.

Bicarbonate

Figure 10:
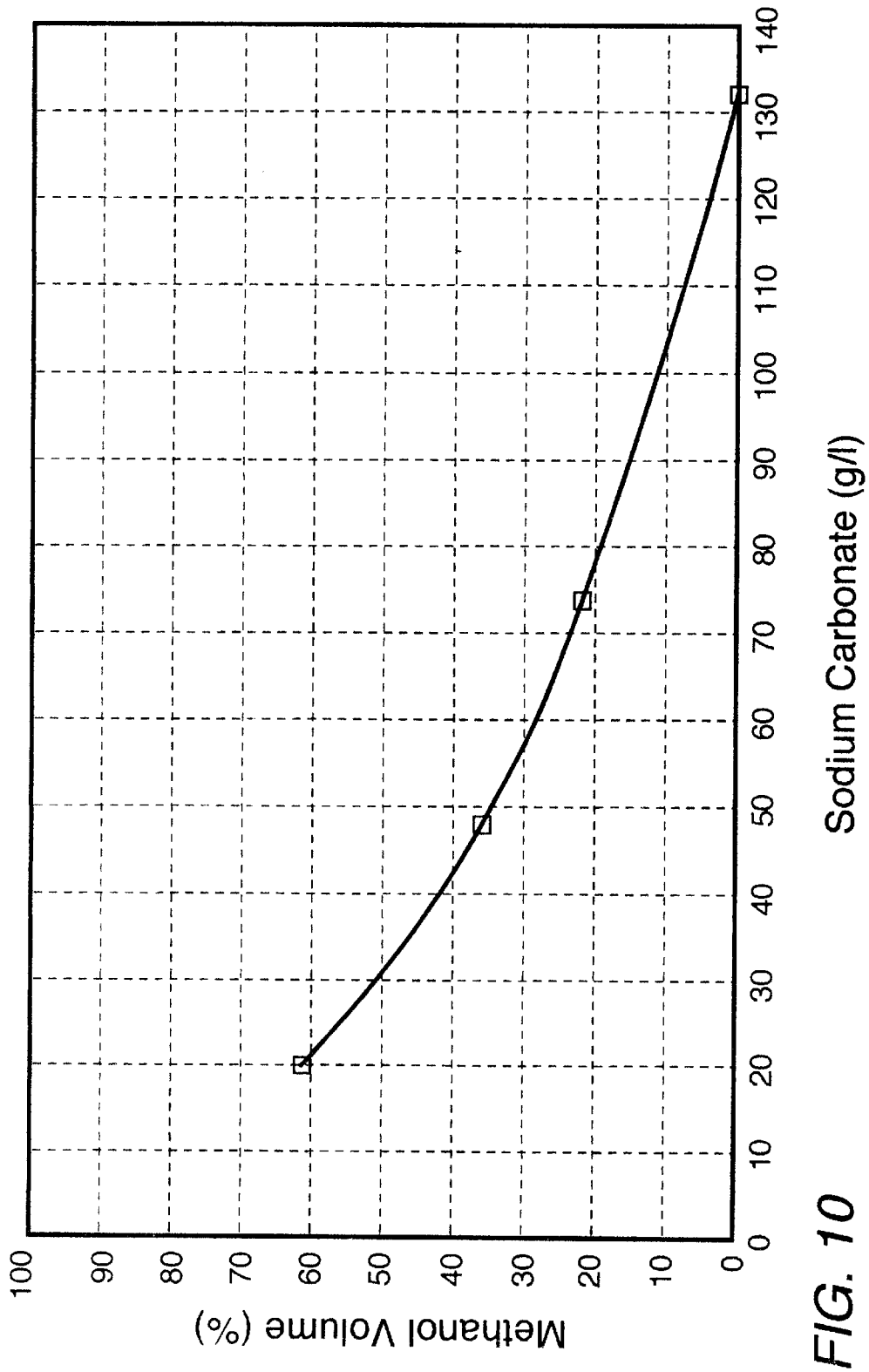
FIG. 10 is a graph of the solubility of sodium bicarbonate in methanol solutions of varying volume percent.
Figure 11:
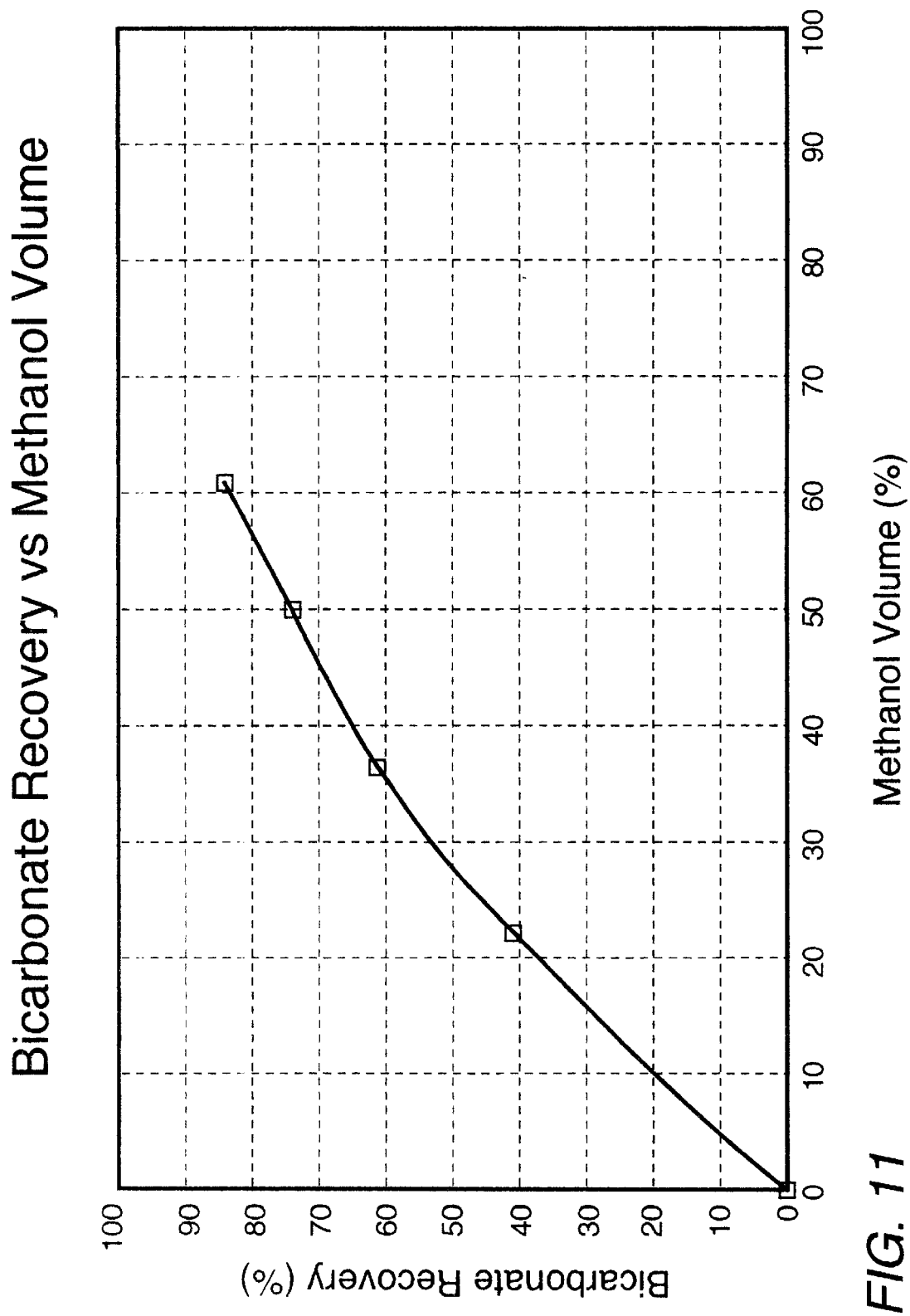
FIG. 11 is a graph of bicarbonate recovery relative to methanol volume percent where the bicarbonate is in a saturated solution.
Figure 12:
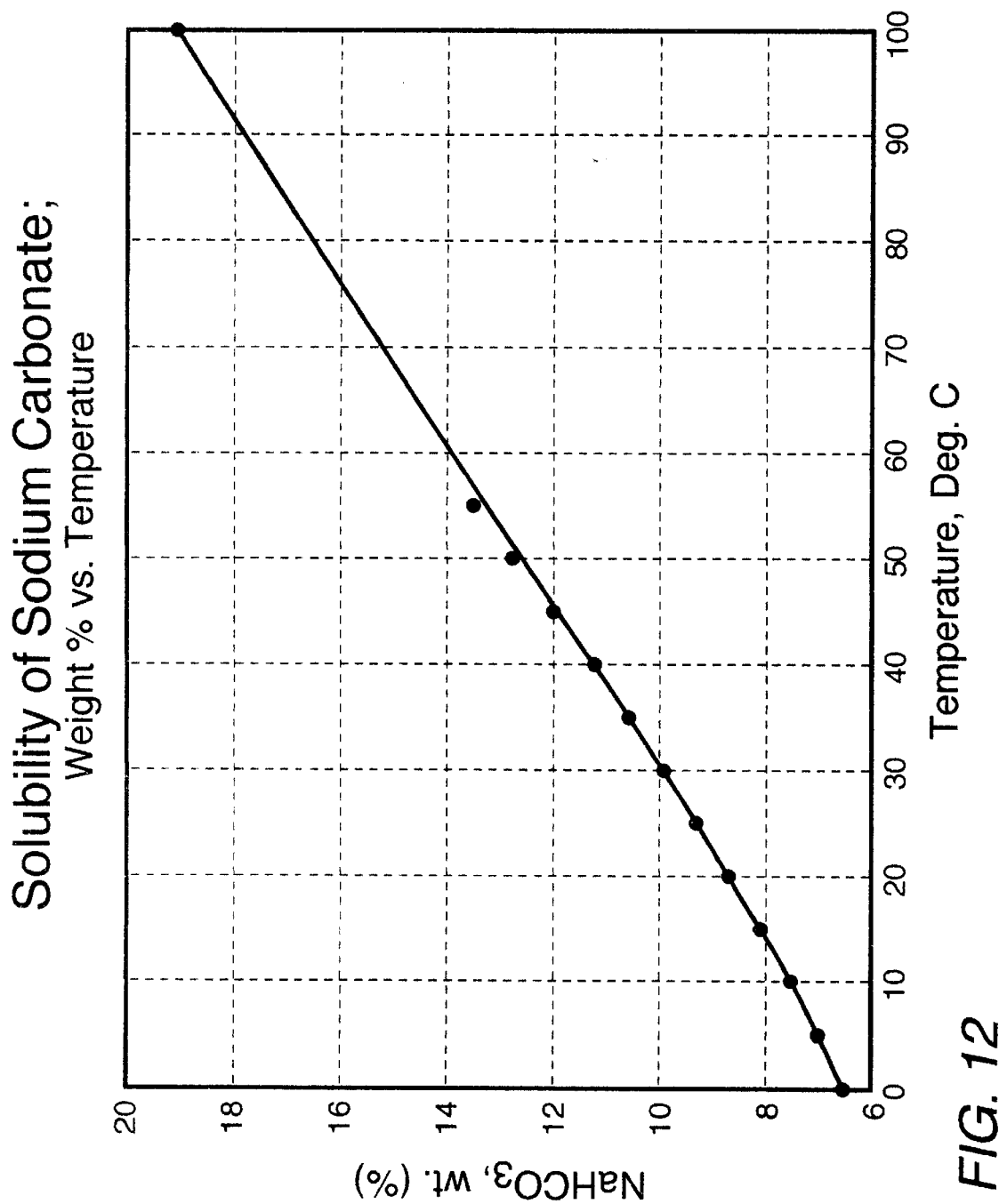
FIG. 12 is a graph of sodium bicarbonate solubility at various temperatures.

Sodium bicarbonate has an increasing solubility with water. At 50° C., the sodium bicarbonate is about 140 g/l of sodium bicarbonate in solution. The solubility of sodium bicarbonate and methanol solutions is indicated in FIG. 10. The recovery of the bicarbonate relative to the methanol volume percent is indicated in FIG. 11. The bicarbonate solution at 50° C. and 140 g/l is at saturation so precipitation of such bicarbonate is initiated upon the first addition of methanol. The needle formation of bicarbonate is similar to the precipitation of sesquicarbonate. As such, the crystals formed by the precipitation of the bicarbonate is similar to the needle formation shown in Table 6.

The following examples show the details of various tests that were carried out of the process of the present invention:

EXAMPLE I

Simulated calcined trona solution containing 230 g/L of $Na_2CO_3$ along with 100 volume percent methanol were pumped simultaneously into a stirred 500 ml E. flask using microprocessor driven Masterflex tubing pumps at rates of 20 ml/minute and 10 ml/minute respectively. The temperature in the E. flask was maintained at 50° C.+/−5° C. The system was run for about 15 minutes, then the resulting crystals were removed from the solution by vacuum filtration. The crystals were washed on the filter using two 75 ml portions of 100% methanol. The washed crystals were dried in an oven at 80° C. for 30 minutes. Following drying the crystals were examined under a scanning electron microscope, the average crystal size measured, The average crystal size was determined to be approximately 400 microns. The crystal size distribution was as follows:

TABLE 7

| | |
|---|---|
| 850 microns and greater | 0% |
| 600 to 850 microns | 2.50% |
| 425 to 600 microns | 49.22% |
| 212 to 425 microns | 30.63% |
| 106 to 212 microns | 16.70% |
| 64 to 106 microns | 0.87 |
| 38 to 64 microns | 0.09% |
| less than 38 microns | 0% |

EXAMPLE II

Simulated calcined trona solution containing 230 g/L of $Na_2CO_3$ along with 100 volume percent methanol were pumped simultaneously into a stirred 500 ml E. flask using microprocessor driven Masterflex tubing pumps at rates of 20 ml/minute and 14 ml/minute respectively. The temperature in the E. flask was maintained at 50° C.+/−5° C. The system was run for about 15 minutes, then the resulting crystals were removed from the solution by vacuum filtration. The crystals were washed on the filter using two 100 ml portions of 100% methanol. The washed crystals were dried in an oven at 80° C. for 30 minutes. Following drying the crystals were examined under a scanning electron microscope, the average crystal size measured. The average crystal size was determined to be approximately 250 microns. The crystal size distribution was as follows:

TABLE 8

| | |
|---|---|
| 850 microns and greater | 0% |
| 600 to 850 microns | 0% |
| 425 to 600 microns | 1.56% |
| 212 to 425 microns | 61.98% |
| 106 to 212 microns | 33.27% |
| 64 to 106 microns | 2.70 |
| 38 to 64 microns | 0.48% |
| less than 38 microns | 0% |

EXAMPLE III

Simulated calcined trona solution containing 230 g/L of $Na_2CO_3$ along with 100 volume percent methanol were pumped simultaneously into a stirred 500 ml E. flask using microprocessor driven Masterflex tubing pumps at rates of 20 ml/minute and 20 ml/minute respectively. The temperature in the E. flask was maintained at 50° C.+/−5° C. The system was run for about 10 minutes, then the resulting crystals were removed from the solution by vacuum filtration. The crystals were washed on the filter using two 100 ml portions of 100% methanol. The washed crystals were dried in an oven at 80° C. for 30 minutes. Following drying the crystals were examined under a scanning electron microscope and the average crystal size measured. The average crystal size was determined to be approximately 150 microns. The crystal size distribution was as follows:

TABLE 9

| | |
|---|---|
| 850 microns and greater | 0% |
| 600 to 850 microns | 0% |
| 425 to 600 microns | 0.14% |
| 212 to 425 microns | 35.37% |
| 106 to 212 microns | 60.12% |
| 64 to 106 microns | 3.76% |
| 38 to 64 microns | 0.50% |
| less than 38 microns | 0.10% |

EXAMPLE IV

Simulated calcined trona solution containing 230 g/L of $Na_2CO_3$ along with 100 volume percent methanol were pumped simultaneously into a stirred 500 ml E. flask using microprocessor driven Masterflex tubing pumps at rates of 20 ml/minute and 20 ml/minute respectively. The temperature in the E. flask was maintained at 50° C.+/−5° C. The system was run for about 8 minutes, then the resulting crystals were removed from the solution by vacuum filtration. The crystals were washed on the filter using two 120 ml portions of 100% methanol. The washed crystals were dried in an oven at 80° C. for 30 minutes. Following drying the crystals were examined under a scanning electron microscope, the average crystal size measured. The average crystal size was determined to be approximately 100 microns. The crystal size distribution was as follows:

TABLE 10

| | |
|---|---|
| 850 microns and greater | 0% |
| 600 to 850 microns | 0% |
| 425 to 600 microns | 0% |
| 212 to 425 microns | 7.68% |
| 106 to 212 microns | 48.25% |
| 64 to 106 microns | 39.01 |
| 38 to 64 microns | 4.95% |
| less than 38 microns | 0.10% |

EXAMPLE V

Crystals were prepared according to the method described in Example III except the crystals were washed with 100 ml of 50 volume percent methanol. Following drying, the crystals were examined using a scanning electron microscope at 1,000× magnification to observe the porosity of the crystals. The density of the crystals was determined by the weight of crystals that would fill a 10 ml graduated cylinder to the 10 ml mark. The graduate was tapped sharply several times on a hard surface after each milliliter (approximately) of crystal addition. The density of the crystals determined by this method was 1.106 g/cc.

EXAMPLE VI

Crystals were prepared according to the method described in Example V except the crystals were washed with 100 ml of 70 volume percent methanol. Following drying, the crystals were examined using a scanning electron microscope at 1,000× magnification to observe the porosity of the crystals. The density of the crystals was determined to be 1.050 g/cc.

EXAMPLE VII

Crystals were prepared according to the method described in Example V except the crystals were washed with 100 ml of 90 volume percent methanol. Following drying, the crystals were examined using a scanning electron microscope at 1.0000× magnification to observe the porosity of the crystals. The density of the crystals was determined to be 0.793 g/cc.

EXAMPLE VIII

Crystals were prepared according to the method described in Example V except the crystals were washed with 100 ml of 90 volume percent methanol. Following drying, the crystals were examined using a scanning electron microscope at 1,000× magnification to observe the porosity of the crystals. The density of the crystals was determined to be 0.793 g/cc.

EXAMPLE IX

Crystals were prepared according to the method describe in Example III except that a temperature of 70° C.+/−5° C. was maintained in the E. flask. The crystals generated showed the same general characteristics as those in Example III.

EXAMPLE X

One-hundred milliliters of a solution of simulated calcined trona containing 230 g/L $Na_2CO_3$ is heated to 50° C.+/−5° C. and stirred continuously. Next 100 ml of methanol are added at the rate of about 10 ml/second. The solution is stirred for 5 minutes and the resulting crystals removed by filtration. The crystals were washed on the vacuum filter with two, 50 ml portions of methanol and dried in an oven at 80° C. for 30 minutes. The crystals showed the following size distribution:

TABLE 11

| | |
|---|---|
| 850 microns and greater | 0% |
| 600 to 850 microns | 0.76% |
| 425 to 600 microns | 1.48% |
| 212 to 425 microns | 2.73% |
| 106 to 212 microns | 21.53% |
| 64 to 106 microns | 56.61 |
| 38 to 64 microns | 14.42% |
| less than 38 microns | 2.45% |

Each of Examples I–X pertain to simulated natural trona solutions which were calcined rather than actual calcined trona. The following examples concern natural trona as well as various mixtures of carbonate and bicarbonate.

EXAMPLE XI 171 g of natural trona was dissolved in approximately 650 ml of DI water at 90° C. Following vacuum filtration, 667 ml of filtrate was collected and analyzed. The filtrate was found to contain 119.2 g/L of $Na_2CO_3$, and 89.4 g/L $Na_2HCO_3$. Methanol and the trona solution were pumped simultaneously into a 500 ml E. flask at rates of 5.4 and 6.2 ml/minute respectively. The system was run for about 20 minutes while maintaining a temperature of 50° C. in the E. flask. The crystals were removed by vacuum filtration, washed on the vacuum filter with two 50 ml portions of 100% methanol and analyzed. The crystals were placed in a sealed plastic bottle and stored in a refrigerator at 5° C. Individual 2 gram (approximately) samples of the crystals were dried in a convection oven at 55, 75, 90, and 100° C. The crystals were analyzed periodically to determine the rate at which bicarbonate was being converted to carbonate. The time required for 100% conversion of bicarbonate to carbonate at the respective temperatures shown on FIG. 5.

EXAMPLE XII—RATIO CHANGE IN CARBONATE TO BICARBONATE WITH METHANOL PRECIPITATION

Two solutions were run. Solution No. 1 contained a mole ratio of sodium carbonate to sodium bicarbonate of approximately 2:1 while Solution No. 2 contained a mole ratio of sodium carbonate to sodium bicarbonate of approximately 0.2:1. There were as follows:

| | g/l Solution No. 1 | Solution No. 2 |
|---|---|---|
| Carbonate | 109.58 | 27.92 |
| Bicarbonate | 35.28 | 88.09 |

These were run at 50° C. and to each was added 30 and 60% methanol. The 30% solution did not precipitate anything at 30% methanol for this second mixture. For Solution No. 1, both methanol runs produced more bicarbonate and reduced carbonate over the initial solution. For Solution No. 2, the 60% solution produced more carbonate and reduced the bicarbonate compared to the original solution on precipitation.

TABLE 12

Mass Balance (g)

| | Sol. #1 - 30% | | Sol. #1 - 60% | | Bicarbonate-to-Carbonate Sol. #2 - 60% | |
|---|---|---|---|---|---|---|
| | Add. | Rec'd. | Add. | Rec'd. | Add. | Rec'd. |
| NaCO | 23.78 | 22.62 | 32.78 | 22.56 | 6.03 | 6.60 |
| NaHCO | 7.65 | 8.33 | 7.65 | 9.44 | 19.03 | 18.62 |
| TOTAL | 31.43 | 30.95 | 31.43 | 32.00 | 25.06 | 25.22 |

EXAMPLE XIII

Effect of Carbonate/Bicarbonate Ratio

Use methanol to generate crystals from solutions with the following carbonate to bicarbonate ratios: 10, 7, 5 3, 2.5, 2, 1.5, 1, 0.5. Generate crystals at 50° C., wash crystals with 100 volume percent methanol. Measure structure, density, and size distribution.

Results

TABLE 13

| | | Size (microns) | | | |
|---|---|---|---|---|---|
| Mole Ratio | Structure | Density | Min. | Max. | Ave. |
| 10.0:1 | No needles | | | | |
| 7.0:1 | No needles | | | | |
| 5.0:1 | Needles on 10% of the crystals | | | | |
| 3.0:1 | Me.Sp.Ne.Agg. | 0.541 | 16 | 83 | 50 |
| 2.5:1 | Me.Sp.Ne.Agg. | 0.532 | 16 | 83 | 50 |
| 2.0:1 | Me.Sp.Ne.Agg. | 0.537 | 16 | 83 | 50 |
| 1.5:1 | Me.Sp.Ne.Arr. | 0.513 | 16 | 83 | 50 |

TABLE 13-continued

| Mole Ratio | Structure | Density | Size (microns) | | |
|---|---|---|---|---|---|
| | | | Min. | Max. | Ave. |
| 1.0:1 | Fi. Lg. Ne. | 0.470 | | | |
| 0.5:1 | VFi. Lg. Ne. | 0.410 | | | |
| 0.2:1 | VFi. Lg. Ne. | 0.350 | | | |

The conversion of bicarbonate to carbonate appears to be one of first precipitation of the carbonate followed by change in equilibrium. This appears to be function of (1) the carbonate to bicarbonate mole ratio and (2) the speed of alcohol addition (speed of precipitation and change in equilibrium). Only at the very high and low ratios of carbonate and bicarbonate mole ratios does the ratio of carbonate to bicarbonate change significantly in the crystals as compared to the solution. In the natural trona range of 1.28, no large change is noted in a continuous flow or batch tests. However the natural trona can be precipitated directly and converted to carbonate in the drying step. The data below compares FMC 100, General Chemical lite ash C.A.S. N. 497-19-8, Phone-Poulenc lite ash, and Methanol Process Large particles lite ash, and Methanol Process Small particles lite ash. The Methanol process Large particles were prepared from calcined trona, the small particles from sesquicarbonate or natural trona. Both Methanol Processes used slow additional of methanol versus rapid addition, i.e. rapid crystallization. These were washed with 100% methanol for density control.

The particle size was determined using a sieve versus a scanning electron microscope. The detergency test is one of relative comparison and is important in how fast the solution will go into solution.

EXAMPLE XIV

FMC Lite Ash Grade 100
Particle Size Distribution
Bulk Density=48.66 #/ft³
Detergency Test—26%

| | % |
|---|---|
| 850µ | 0.0 |
| 600µ | 2.7 |
| 425µ | 4.1 |
| 212µ | 61.1 |
| 106µ | 27.3 |
| 63µ | 4.2 |

µ = micron

Crystals—Large Rods
  General Chemical Lite Ash
  Particle Size Distribution
  Bulk Density 36.52 #/ft³
  Detergency Test—30.4%

| | % |
|---|---|
| 850µ | 0.0 |
| 600µ | 0.0 |
| 425µ | 0.0 |
| 211µ | 10.9 |
| 106µ | 26.3 |
| 63µ | 30.0 |
| 38µ | 20.4 |
| <38µ | 12.5 |

Crystals—Small Spheric
  Rhone-Poulenc Lite Ash
  Bulk Density 49.58 #/ft³
  Detergency Test 16%

| | % |
|---|---|
| 850µ | 0.3 |
| 600µ | 3.5 |
| 425µ | 15.4 |
| 212µ | 49.7 |
| 106µ | 17.3 |
| 63µ | 1.2 |
| 38µ | 0.1 |
| <38µ | 0.0 |

Crystals—Large Rods—Semi-Spherical
  Methanol Process
  Large Particles
  Bulk Density 49.89 #/ft³
  Detergency Test 16%

| | % |
|---|---|
| 850µ | 4.2 |
| 600µ | 12.4 |
| 425µ | 35.2 |
| 212µ | 35.2 |
| 106µ | 9.8 |
| 63µ | 2.5 |
| 38µ | 1.4 |
| <38µ | 0.0 |

Crystals—Large Rods
  Methanol Process
  Small Particles (Trona)
  Particle Size Distribution
  Bulk Density 15.01 #/ft³
  Detergency Test—49.5%

| | % |
|---|---|
| | Test 1 |
| 850µ | 0.0 |
| 600µ | 0.0 |
| 425µ | 0.0 |
| 212µ | 0.2 |
| 106µ | 4.4 |
| 63µ | 13.4 |
| 38µ | 33.7 |
| <38µ | 48.3 |
| | Test 2 |
| 850µ | 0.0 |
| 600µ | 0.0 |
| 425µ | 4.5 |
| 212µ | 17.3 |

| | |
|---|---|
| -continued | |
| 106μ | 20.6 |
| 63μ | 28.1 |
| 38μ | 19.0 |
| <38μ | 10.5 |

Crystals—Small Needles

EXAMPLE XV

Slow Addition of Methanol in Pilot Unit 20 gallons Bulk Density=49.9 #/ft³ Detergency Test—26.2%

| | % |
|---|---|
| 850μ | 0.0 |
| 600μ | 7.8 |
| 425μ | 29.9 |
| 212μ | 45.5 |
| 106μ | 13.9 |
| 63μ | 2.0 |
| 38μ | 0.9 |
| <38μ | 0.0 |

Crystals—Large Rods

EXAMPLE XVI—COMPARISON OF SLOW ADDITION AND FAST ADDITION OF METHANOL ON CRYSTAL SIZE DISTRIBUTION 50° C. TEST CONDITION

TEST 1—Calcined trona from Green River Plant—Methanol added over 100 min. to 70% by volume TEST 2—Calcined trona from Green River Plant—Simultaneously Methanol added at 52 ml/min with trona solution at 22 ml/min.

Size Distribution Determine via Sieve

| Micron | Test 1 | Test 2 |
|---|---|---|
| 850μ | 0.85 | 0.00 |
| 600μ | 29.62 | 0.00 |
| 425μ | 34.12 | 1.61 |
| 212μ | 23.10 | 33.63 |
| 106μ | 15.88 | 33.63 |
| 63μ | 5.53 | 33.63 |
| 38μ | 1.03 | 11.36 |
| pan | 0.27 | 5.77 |

Notice that in Example XIII, the sesquicarbonate with slow addition formed even smaller crystals than the calcined trona with fast addition. The large crystals, by slow addition, are slightly smaller than the large particles in Example XVI, which were run at a different time, different calcined sample and different chemist.

Thus 1) speed of adding the two solutions 2) volume of methanol and 3) calcined or uncalcined trona can be used to affect crystal size. Speed of the mixer is also important in final carbonate distribution. In addition, adding of the aqueous solution to a methanol stream provides an even additional method of crystal size control. Another factor is that sulfate is a crystal modifier and therefore can make larger particles. The crystal morphology is affected by speed of addition as well as initial solution.

EXAMPLE XVII—CARBONATE TO BICARBONATE

Data showing relationship between temperature, pressure, and time for the conversion of carbonate to bicarbonate using carbon dioxide.

Samples of crystals (after methanol wash but before drying) generated by the methanol process from solutions of natural trona and calcined trona were placed in a pressure bomb and the bomb pressurized with $CO_2$. The bomb was de-pressurized at various intervals and the crystals removed and analyzed to determine the percent conversion of carbonate to bicarbonate. The crystals were returned to the bomb and the bomb re-pressurized. This procedure was repeated until nearly all the carbonate was converted to bicarbonate or for a maximum of 120 minutes. The time of pressurization was recorded. Pressures of 6, 18 and 31.5 psi were used at temperatures of 15, 25, and 50° C. for crystals generated from natural trona. Only a pressure of 31.5 psig and a temperature of 20° C. was used for calcined trona.

Crystals Generated From Natural Trona

Analysis initial $Na_2CO_3$=22.2%

$NaHCO_3$=18.4%

Moisture=59.4%

| Time (min) | Pressure (psig) | Temperature (°C.) | Conversion (%) |
|---|---|---|---|
| 20 | 6 | 15 | 50.0 |
| 40 | 6 | 15 | 80.0 |
| 60 | 6 | 15 | 93.0 |
| 80 | 6 | 15 | 93.8 |
| 120 | 6 | 15 | 95.4 |
| 20 | 6 | 25 | 81.3 |
| 40 | 6 | 25 | 92.2 |
| 120 | 6 | 25 | 93.9 |
| 10 | 6 | 50 | 52.4 |
| 25 | 6 | 50 | 91.1 |
| 40 | 6 | 50 | 91.0 |
| 60 | 6 | 50 | 91.4 |
| 120 | 6 | 50 | 91.8 |
| 5 | 18 | 15 | 44.9 |
| 10 | 18 | 15 | 73.1 |
| 15 | 18 | 15 | 92.0 |
| 40 | 18 | 15 | 98.2 |
| 6 | 18 | 25 | 58.7 |
| 11 | 18 | 25 | 98.6 |
| 20 | 18 | 25 | 99.1 |
| 5 | 18 | 50 | 87.2 |
| 10 | 18 | 50 | 98.6 |
| 15 | 18 | 50 | 99.1 |
| 6 | 31.5 | 15 | 48.9 |
| 10 | 31.5 | 15 | 74.8 |
| 15 | 31.5 | 15 | 93.4 |
| 20 | 31.5 | 15 | 99.8 |
| 5 | 31.5 | 25 | 85.3 |
| 10 | 31.5 | 25 | 98.6 |
| 15 | 31.5 | 25 | 100.0 |
| 3 | 31.5 | 50 | 74.7 |
| 8 | 31.5 | 50 | 99.4 |

Crystals Generated From Natural Trona

Analysis initial $Na_2CO_3$=89.7%

$NaHCO_3$=0%

Moisture=10.3%

| Time (min) | Pressure (psig) | Temperature (°C.) | Conversion (%) |
|---|---|---|---|
| 5 | 31.5 | 25 | 3.0 |
| 21 | 31.5 | 25 | 3.0 |
| 60 | 31.5 | 25 | 38.0 |
| 120 | 31.5 | 25 | 42.2 |

-continued

| Time (min) | Pressure (psig) | Temperature (°C.) | Conversion (%) |
|---|---|---|---|
| 10 | 31.5 | 25 | 2.8 |
| 30 | 31.5 | 25 | 3.6 |
| 60 | 31.5 | 25 | 12.9 |
| 90 | 31.5 | 25 | 25.4 |
| Add 3 drops of water | | | |
| 10 | 31.5 | 25 | 85.7 |
| 20 | 31.5 | 25 | 98.8 |

EXAMPLE XIX—AQUEOUS SOLUTION ADDED TO ALCOHOL SOLUTION

Aqueous Solution

| Carbonate | 329.5 g/l |
|---|---|
| Bicarbonate | 3.0 g/l |
| Sulfate | 1800 ppm |

Solutions were added at 50° C. and washed with 100% methanol and dried at 140° C. for two hours. In the first case the aqueous was added at 2 ml/min for 100 min. while in the second the solution was added at 200 ml/min.

| | 2 ml/min crystals | 200 ml/min crystals |
|---|---|---|
| Density #/ft$^3$ | 32.28 | 27,73 |
| Sulfate-ppm | 3,217 | 3,838 |
| Size Distribution - % | | |
| Micron | | |
| 600M | 0.0 | 0.0 |
| 425M | 0.3 | 0.4 |
| 212M | 1.3 | 2.7 |
| 106M | 9.4 | 15.8 |
| 63M | 40.6 | 33.1 |
| 38M | 39.4 | 33.9 |
| pan <38M | 9.1 | 14.1 |

The crystal sizes are smaller than adding methanol to the aqueous stream of carbonate but larger than to natural trona. Of course sulfate is a known crystal modifier (usually increases crystal size) so some difference will be obtained without sulfate.)

The foregoing disclosure and description of the invention is illustrative and explanatory thereof. Various changes in the details of the described method may be made within the scope of the appended claims without departing from the true spirit of the invention. The present invention should only be limited by the following claims and their legal equivalents.

I claim:

1. A method of producing sodium carbonate crystals from a sodium carbonate-containing solution comprising the steps of:
    passing the sodium carbonate-containing solution to a precipitator, said sodium carbonate-containing solution having a sodium carbonate concentration ranging from 100 g/l to saturation;
    adding methanol to the sodium carbonate-containing solution and the precipitator such that a resultant liquor has methanol in a concentration of between 15 and less than 70% by volume, said methanol being in residence with said sodium carbonate-containing solution for between 10 and 100 minutes;
    precipitating sodium carbonate crystals from the resulting liquor;
    washing the precipitated sodium carbonate crystals with an alcohol-containing solution; and
    drying the washed precipitated sodium carbonate crystals.

2. The method of claim 1, said sodium carbonate-containing solution having a concentration of sodium carbonate ranging from 300 g/l at 82° C. to saturation, said resultant liquor having a methanol concentration of between 30% and 70% by volume.

3. The method of claim 2, said resultant liquor having a methanol concentration of between 40% and 60% by volume.

4. The method of claim 2, said alcohol-containing solution having an alcohol concentration ranging between 50 and 100%.

5. The method of claim 4, said alcohol-containing solution having an alcohol selected from the group consisting of: methanol, ethanol, propanol, and butanol.

6. The method of claim 2, further comprising the steps of:
    passing the sodium carbonate-containing solution from the first precipitator to a second precipitator;
    adding methanol to the sodium carbonate-containing solution in the second precipitator such that a resultant liquor has a concentration of methanol of greater than the concentration of methanol in the first precipitator but no more than 70% methanol;
    precipitating crystals from said resultant liquor in the second precipitator, said crystals having a size distribution in which greater than 50% of the crystals have a diameter of less than 106 microns; and
    recycling said crystals from said second precipitator to the first precipitator.

7. The method of claim 6, the precipitated sodium carbonate crystals having a size distribution in which greater than 50% of the crystals has a diameter of more than 106 microns.

8. The method of claim 7, said methanol being in residence with said sodium carbonate-containing solution in the first precipitator for between 80 and 100 minutes.

9. The method of claim 1, said sodium carbonate-containing solution being tailing pond water having a sodium carbonate concentration ranging between 135 g/l and 380 g/l, said sodium carbonate-containing solution having a sulfate ion content of between 2 g/l and 5 g/l, said resultant liquor having methanol in a concentration ranging between 40% and 50% by volume.

10. The method of claim 9, said alcohol-containing solution having an alcohol concentration ranging between 50 and 100%.

11. The method of claim 10, said alcohol-containing solution having an alcohol selected from the group consisting of: methanol, ethanol, propanol, and butanol.

12. The method of claim 1, further comprising the step of:
    washing the precipitated crystals with saturated sodium carbonate solution prior to the step of washing with the alcohol-containing solution.

13. The method of claim 1, said sodium carbonate-containing solution being added to a stream of methanol in a path toward said precipitator.

14. A method of producing crystals from a sodium sesquicarbonate solution comprising the steps of:
    passing the sodium sesquicarbonate solution to a precipitator;

adding methanol to the sodium sesquicarbonate solution in the precipitator such that a resultant liquor has methanol in a concentration of between 30% and 70% by volume;

precipitating sesquicarbonate crystals from the resultant liquor;

washing the precipitated sesquicarbonate crystals with an alcohol-containing solution having alcohol in a concentration of between 50 and 100 volume percent so as to control a density of said crystals; and drying the washed precipitated sesquicarbonate crystals.

15. The method of claim 14, further comprising the step of:

mixing the sodium sesquicarbonate solution in a sodium carbonate-containing solution, said sodium carbonate-containing solution having a concentration of sodium carbonate of approximately 200 g/l.

16. The method of claim 14, further comprising the step of:

mixing the sodium sesquicarbonate solution with an equal amount of a sodium carbonate-containing solution, said sodium carbonate-containing solution having a concentration of sodium carbonate of approximately 400 g/l.

17. The method of claim 14, said precipitated sesquicarbonate crystals containing carbonate crystals and bicarbonate crystals, said step of drying comprising the step of:

drying the washed precipitated sesquicarbonate crystals at a temperature below 50° C. so as to prevent conversion of the bicarbonate crystals to carbonate crystals.

18. The method of claim 14, said precipitated sesquicarbonate crystals containing carbonate crystals and bicarbonate crystals, said step of drying comprising the step of:

heating the washed precipitated sesquicarbonate crystals at a temperature of between 110° C. and 150° C. so as to convert the bicarbonate crystals to carbonate crystals.

19. The method of claim 14, said precipitated sesquicarbonate crystals containing carbonate crystals and bicarbonate crystals, said step of drying comprising the step of:

heating the washed precipitated sesquicarbonate crystals in an atmosphere of carbon dioxide so as to convert the carbonate crystals into bicarbonate crystals.

20. A method of producing crystals from a solution containing a mixture of sodium carbonate and sodium bicarbonate comprising the steps of:

passing the solution to a first precipitator, the mixture having a mole ratio of sodium carbonate to sodium bicarbonate of 5 or less;

adding methanol to the solution in the first precipitator such that a resultant liquor has methanol in a concentration of between 30% and 50% by volume, said methanol being in residence with said solution for between 10 and 100 minutes;

precipitating the sodium carbonate crystals and the sodium bicarbonate crystals from the resultant liquor;

washing the precipitated sodium carbonate crystals and the precipitated sodium bicarbonate crystals with an alcohol-containing solution having alcohol in a concentration of between 50 and 100 volume percent; and drying the washed sodium carbonate crystals and the washed sodium bicarbonate crystals.

21. The method of claim 20, further comprising the steps of:

passing the solution to a second precipitator;

adding methanol to the solution in the second precipitator such that a resultant liquor has a concentration of methanol of between 50% and 70% by volume;

precipitating small crystals from the resultant liquor in the second precipitator, said small crystals having a size distribution in which more than 50% of the crystals have a diameter of less than 100 microns; and recycling said small crystals from said second precipitator to the first precipitator.

22. The method of claim 21, said sodium carbonate crystals precipitated from the first precipitator having a greater size distribution in which more than 50% of the crystals have a diameter of greater than 106 microns.

23. The method of claim 22, said methanol being in residence with said sodium carbonate crystals and said sodium bicarbonate crystals in said first precipitator for between 80 and 100 minutes.

24. The method of claim 20, said step of drying the washed crystals comprising the step of:

drying the washed crystals at a temperature below 50° C. so as to prevent conversion of the bicarbonate crystals into carbonate crystals.

25. The method of claim 20, said step of drying comprising the step of:

heating the washed crystals at a temperature of between 110° C. and 150° C. so as to convert the bicarbonate crystals into carbonate crystals.

26. The method of claim 20, said step of drying comprising the step of:

heating the washed crystals in an atmosphere of carbon dioxide so as to convert the carbonate crystals into bicarbonate crystals.

27. A method of forming rod-shaped sodium carbonate crystals from a sodium carbonate-containing solution comprising the steps of:

passing the sodium carbonate-containing solution to a precipitator, said sodium carbonate-containing solution having a sodium carbonate concentration ranging from 300 g/l at 82° C. to saturation;

adding methanol to the sodium carbonate-containing solution in the precipitator such that a resultant liquor has methanol in a concentration of between 15% and 70% by volume, said methanol being in residence with said sodium carbonate-containing solution for between 80 and 100 minutes;

precipitating sodium carbonate crystals from the resultant liquor;

washing the precipitated sodium carbonate crystals with an alcohol-containing solution; and drying the washed precipitated sodium carbonate crystals.

28. The method of claim 27, said resultant liquor having methanol in a concentration of between 40% and 50% by volume.

29. The method of claim 27, said alcohol-containing solution having an alcohol concentration ranging between 50% and 100%.

* * * * *